US011095808B2

(12) United States Patent
Kim et al.

(10) Patent No.: US 11,095,808 B2
(45) Date of Patent: Aug. 17, 2021

(54) TERMINAL AND METHOD FOR CONTROLLING THE SAME

(71) Applicant: LG ELECTRONICS INC., Seoul (KR)

(72) Inventors: Yung Kim, Seoul (KR); Jungmin Lee, Seoul (KR); Jeongeun Choi, Seoul (KR); Hyedeuk Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 627 days.

(21) Appl. No.: 15/904,165

(22) Filed: Feb. 23, 2018

(65) Prior Publication Data

US 2018/0213144 A1    Jul. 26, 2018

Related U.S. Application Data

(63) Continuation of application No. 14/285,367, filed on May 22, 2014, now Pat. No. 9,930,246.

(30) Foreign Application Priority Data

Jul. 8, 2013 (KR) .................. 10-2013-0079876

(51) Int. Cl.
   *H04N 5/232* (2006.01)
   *G06F 3/0484* (2013.01)
   (Continued)

(52) U.S. Cl.
   CPC ......... *H04N 5/23216* (2013.01); *G06F 3/016* (2013.01); *G06F 3/0488* (2013.01);
   (Continued)

(58) Field of Classification Search
   CPC ............ H04N 5/23216; H04N 5/2356; H04N 5/23293; H04N 5/232127;
   (Continued)

(56) References Cited

U.S. PATENT DOCUMENTS 7,084,910 B2 * 8/2006 Amerson ......... H04N 5/232133
                                              348/239
8,478,347 B2 * 7/2013 Kim ................. H04N 5/232945
                                              455/566

(Continued)

FOREIGN PATENT DOCUMENTS

| JP | 2011048341 | 3/2011 |
| KR | 1020050024029 | 3/2005 |
| KR | 1020080044619 | 5/2008 |

OTHER PUBLICATIONS

United States Patent and Trademark Office U.S. Appl. No. 14/285,367, Office Action dated Apr. 8, 2016, 20 pages.

(Continued)

*Primary Examiner* — Pritham D Prabhakher
(74) *Attorney, Agent, or Firm* — Lee Hong Degerman Kang & Waimey

(57) ABSTRACT

The present disclosure may provide a mobile terminal including a camera unit configured to acquire a plurality of images for which focuses are formed at different regions at the same time, a memory unit configured to store the plurality of images, a display unit configured to display a representative image among the plurality of images, and a controller configured to control the display unit such that the representative image among the plurality of images is converted to another image based on a touch input applied to the display unit.

14 Claims, 21 Drawing Sheets

(51) Int. Cl.
*G06F 3/0488* (2013.01)
*H04N 5/235* (2006.01)
*G06F 3/01* (2006.01)

(52) U.S. Cl.
CPC ...... *G06F 3/04842* (2013.01); *G06F 3/04845* (2013.01); *H04N 5/2356* (2013.01); *H04N 5/23293* (2013.01); *H04N 5/232127* (2018.08); *H04N 5/232933* (2018.08); *G06F 2203/04108* (2013.01)

(58) Field of Classification Search
CPC ............ H04N 5/232933; G06F 3/0488; G06F 3/04842; G06F 3/04845; G06F 3/016; G06F 2203/04108
See application file for complete search history.

(56) References Cited

U.S. PATENT DOCUMENTS

| | | | | |
|---|---|---|---|---|
| 8,649,574 | B2* | 2/2014 | Mise | H04N 5/232945 |
| | | | | 382/118 |
| 9,282,175 | B2* | 3/2016 | Choi | G02B 30/27 |
| 9,596,412 | B2* | 3/2017 | Lee | H04N 5/23293 |
| 2003/0151679 | A1* | 8/2003 | Amerson | H04N 5/772 |
| | | | | 348/231.6 |
| 2008/0176598 | A1 | 7/2008 | Hur | |
| 2010/0173678 | A1* | 7/2010 | Kim | H04N 5/23219 |
| | | | | 455/566 |
| 2011/0019067 | A1 | 1/2011 | Matsumoto et al. | |
| 2011/0134273 | A1* | 6/2011 | Mise | H04N 5/23212 |
| | | | | 348/222.1 |
| 2012/0027393 | A1* | 2/2012 | Tsuda | H04N 5/23212 |
| | | | | 396/102 |
| 2012/0092457 | A1* | 4/2012 | Sugino | H04N 13/286 |
| | | | | 348/46 |
| 2012/0105590 | A1* | 5/2012 | Fukumoto | H04N 5/232935 |
| | | | | 348/46 |
| 2012/0120277 | A1* | 5/2012 | Tsai | H04N 5/232123 |
| | | | | 348/223.1 |
| 2012/0194544 | A1* | 8/2012 | Yokohata | H04N 1/00453 |
| | | | | 345/619 |
| 2013/0135510 | A1* | 5/2013 | Lee | H04N 5/23212 |
| | | | | 348/333.02 |
| 2013/0141435 | A1* | 6/2013 | Cho | H04N 13/302 |
| | | | | 345/426 |
| 2013/0165186 | A1* | 6/2013 | Choi | G02B 30/25 |
| | | | | 455/566 |
| 2013/0265467 | A1* | 10/2013 | Matsuzawa | H04N 5/232945 |
| | | | | 348/240.1 |
| 2015/0009391 | A1 | 1/2015 | Kim et al. | |

OTHER PUBLICATIONS

Korean Intellectual Property Office Application No. 10-2013-0079876, Office Action dated Jul. 24, 2019, 5 pages.

* cited by examiner

TERMINAL AND METHOD FOR CONTROLLING THE SAME

CROSS-REFERENCE TO RELATED APPLICATIONS

This application is a continuation of U.S. patent application Ser. No. 14/285,367, filed on May 22, 2014, now U.S. Pat. No. 9,930,246, which claims the benefit of earlier filing date and right of priority to Korean Application No. 10-2013-0079876, filed on Jul. 8, 2013, the contents of which are all hereby incorporated by reference herein in their entirety.

BACKGROUND

1. Field

The present disclosure relates to a mobile terminal including a camera configured to image an object and a display unit configured to display an image of the object.

2. Background

Terminals can be classified into two types, such as a mobile or portable terminal and a stationary terminal based on its mobility. Furthermore, the mobile terminal can be further classified into two types, such as a handheld terminal and a vehicle mount terminal based on whether or not it can be directly carried by a user.

As the function becomes diversified, the terminal is implemented in the form of a multimedia player having complicated functions such as capturing still or moving images, playing music or video files, gaming, receiving broadcast, and the like. Moreover, improvements in the structural and software elements of the terminal may be taken into consideration to support and enhance the function of the terminal.

In recent years, studies on the diversification of technologies for capturing images and functions for editing the captured images have been carried out as increasing the consumer's desire to capture a photo using a mobile terminal.

Furthermore, functions for acquiring a plurality of images based on a user's one-time control command as well as technologies for acquiring one image at a time have been added to the mobile terminal. However, there is a drawback in which a plurality of images captured at a time cannot be edited by applying all criteria based on the user's intention.

SUMMARY OF THE INVENTION

Accordingly, a technical task of the present disclosure is to provide a mobile terminal capable of editing a plurality of images at once based on the user's intention.

In order to accomplish the foregoing task of the present disclosure, a terminal according to an embodiment of the present disclosure may include a camera unit configured to acquire a plurality of images at the same time for which their focuses are formed on different regions, a memory unit configured to store the plurality of images, a display unit configured to display a representative image among the plurality of images, and a controller configured to control the display unit to convert the representative image among the plurality of images to another image based on a touch input applied to the display unit.

As an example associated with the present invention, the display unit may display a plurality of representative images acquired by the same control command, and the controller may convert one representative image to a focus-changed image associated with the representative image having a focus on a changed region based on the touch input, and the controller may control the display unit to convert each focus-changed image associated with the other representative images, respectively, for which the focus is formed in the changed region based on the touch input.

As an example associated with the present invention, when the display unit displays a plurality of representative images containing a plurality of different objects, the controller may control the display unit to convert at least one representative image containing one object selected by the touch input to the another image.

As an example associated with the present invention, the controller may control the display unit to display an image focused on the object among the plurality of images as the another image.

As an example associated with the present invention, the plurality of objects may correspond to a plurality of figures having at least their gazes, respectively, and the controller may control the display unit to select a plurality of figures based on the touch input, and display another image associated with the representative image for which the focus is adjusted to the plurality of figures, respectively.

As an example associated with the present invention, the controller may control the display unit to adjust the brightness of at least one representative image that does not contain the selected figure.

As an example associated with the present invention, the plurality of objects may correspond to a plurality of figures, and the controller may control such that another image for which the focus is formed on the selected figure is shared based on a figure selected by the user and a control command for sharing the representative image.

As an example associated with the present invention, the representative image may contain a plurality of objects, and the controller may control the display unit to determine the sequence of a plurality of objects based on the touch input and display each object with a definition corresponding to the sequence.

As an example associated with the present invention, the controller may control the display unit to receive a touch input for determining the sequence and display a control image containing graphic images containing information on the objects.

As an example associated with the present invention, the graphic images may be arranged in the sequential manner, and the controller may control the display unit to change the definition of each object based on a touch input for changing the arrangement of the graphic images.

As an example associated with the present invention, the memory may include a plurality of associated images acquired along with the representative image at the same time but acquired at different angles, and the controller may control the display unit to display angle-modified images acquired at a different angle from that of the representative image based on the touch input.

As an example associated with the present invention, when a plurality of representative images acquired by the same control command are displayed at once, the controller may control the display unit to display a plurality of angle-modified images acquired at different angles that are set based on the touch input and associated with the representative images, respectively.

As an example associated with the present invention, the controller may control the display unit to display a control image displayed on the representative image to receive a consecutive touch input, and the controller may control the display unit to convert the representative image to the angle-modified image based on the consecutive touch input.

As an example associated with the present invention, the controller may track at least one figure contained in the representative image, and the controller may control the display unit to display an angle-modified image acquired at an angle associated with the gaze of a figure selected by the touch input.

As an example associated with the present invention, the controller may extract a plurality of objects constituting the representative image that are displayed with different definitions, and control the display unit to display at least one application icon for performing a function based on information on an object selected by the user from the plurality of objects.

In order to accomplish the foregoing task of the present disclosure, a control method of a mobile terminal according to another embodiment of the present disclosure may include acquiring a plurality of images at the same time for which their focuses are formed on different regions, storing the plurality of images, displaying a representative image among the plurality of images, and converting the representative image to another image among the plurality of images based on a touch input applied to the display unit.

BRIEF DESCRIPTION OF THE DRAWINGS

The embodiments will be described in detail with reference to the following drawings in which like reference numerals refer to like elements wherein.

DETAILED DESCRIPTION

Figure 1:
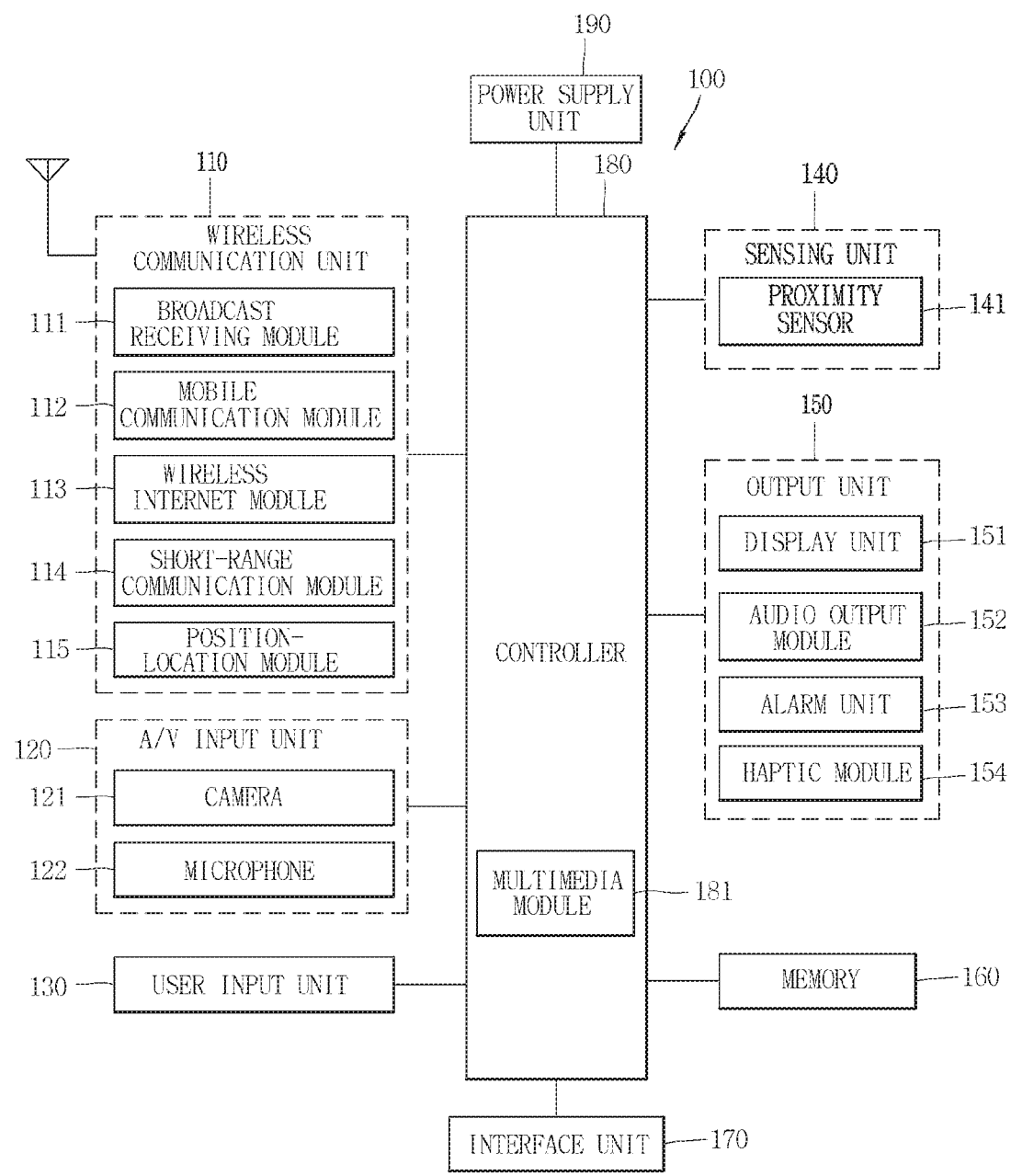
FIG. 1 is a block diagram illustrating a mobile terminal according to an embodiment disclosed in the present disclosure.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the concept of the invention, and therefore, they should not be construed to limit the technological concept disclosed herein by the accompanying drawings.

A terminal disclosed herein may include a portable phone, a smart phone, a laptop computer, a digital broadcast terminal, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment disclosed in the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the foregoing constituent elements will be described in sequence.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement an video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the terminal, and there is a Global Positioning Module (GPS) module or Wireless Fidelity (WiFI) as a representative example.

Referring to FIG. 1, the A/V (audio/video) input unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and output into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the terminal is open or closed. Other examples include sensing functions, such as the sensing unit 140 sensing the presence or absence of power provided by the power supply unit 190, the presence or absence of a coupling between the interface unit 170 and an external device.

The output unit 150 is configured to generate an output associated with visual sense, auditory sense or tactile sense, and may include a display unit 151, an audio output module 153, an alarm unit 154, a haptic module 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

Furthermore, the display unit 151 may be configured with a stereoscopic display unit 152 for displaying a stereoscopic image.

Here, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. Here, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

For 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit (not shown). The stereoscopic processing unit receives a 3D image to extract a left image and a right image from the 3D image, or receives a 2D image to convert it into a left image and a right image.

On the other hand, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor 141 may be arranged at an inner region of the mobile terminal 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (for example, proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include a proximity sensor 141, a stereoscopic touch sensing unit 142, a ultrasound sensing unit 143, and a camera sensing unit 144.

The proximity sensor 141 measures a distance between the sensing object (for example, the user's finger or stylus pen) and a detection surface to which a touch is applied using an electromagnetic field or infrared rays without a mechanical contact. The terminal may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound.

For example, the ultrasound sensing unit 143 may be configured with an optical sensor and a plurality of ultrasound sensors. The optical sensor may be formed to sense light, and the ultrasound sensor may be formed to sense ultrasound waves. Since light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

The camera sensing unit 144 may include at least one of a camera 121, a photo sensor, and a laser sensor.

For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

For another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may include a receiver, a speaker, a buzzer, and so on.

The alarm 154 outputs signals notifying occurrence of events from the mobile terminal 100. The events occurring from the mobile terminal 100 may include call received, message received, key signal input, touch input, and so on. The alarm 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input carried out on the touch screen as text or image.

Furthermore, the controller 180 may implement a lock state for limiting the user's control command input to applications when the state of the terminal satisfies a preset condition. Furthermore, the controller 180 may control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate operation described in the present disclosure.

Software codes can be implemented by a software application written in any suitable programming language. The software codes may be stored in the memory 160 and executed by the controller 180.

Figure 2A:
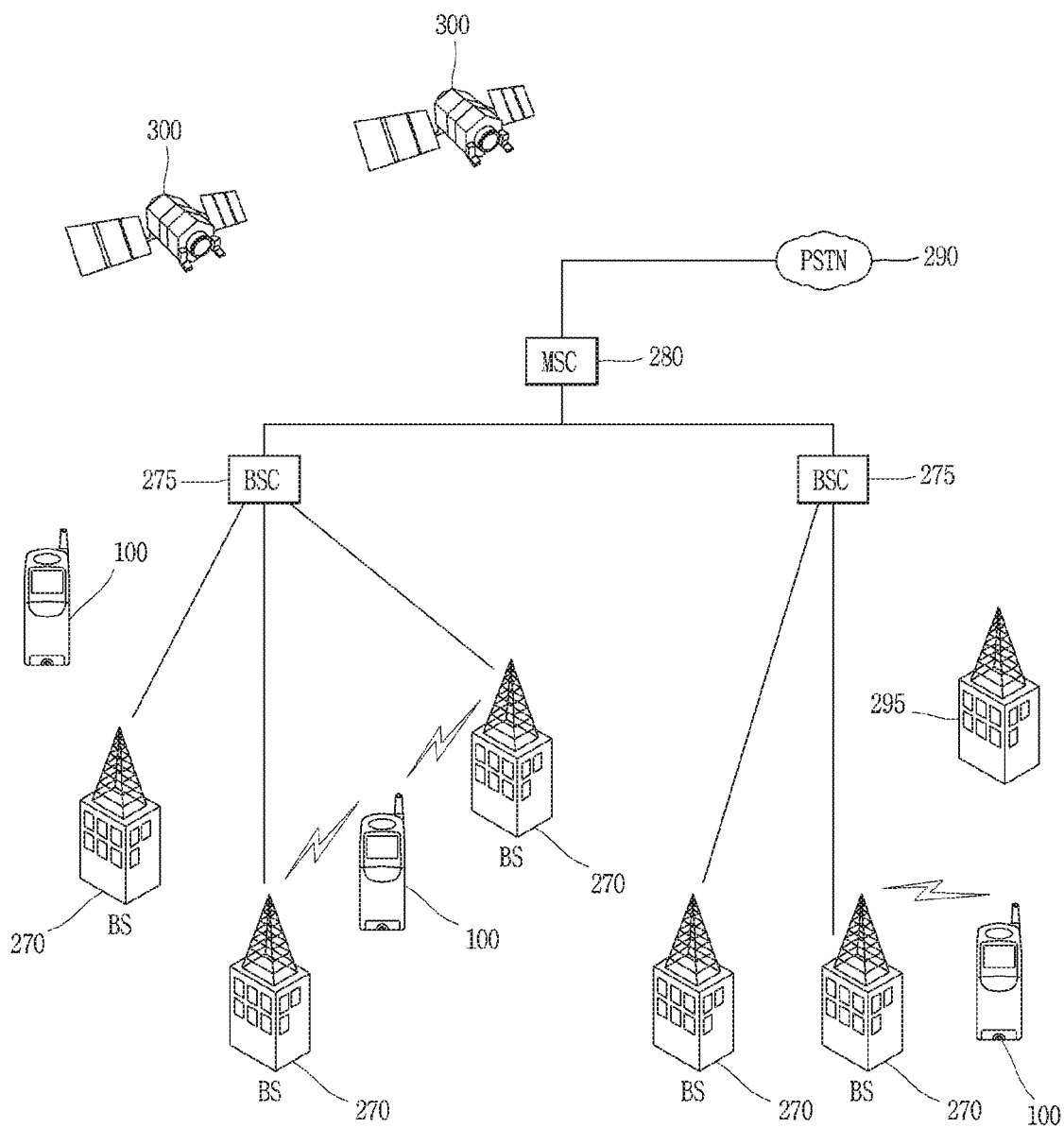
FIGS. 2A and 2B are conceptual views illustrating a communication system in which a terminal according to the present disclosure is operable.
Figure 2B:
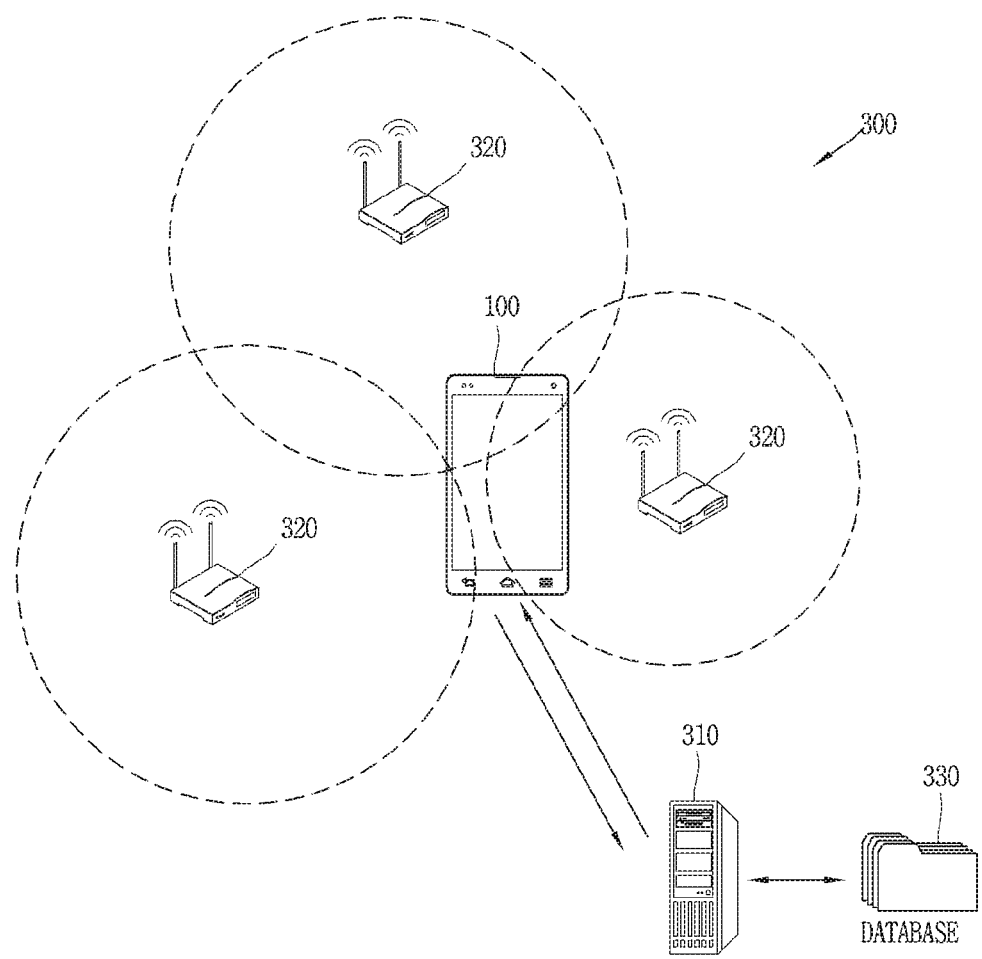

Next, a communication system that can be implemented through the mobile terminal 100 according to the present disclosure will be described. FIGS. 2A and 2B are conceptual views illustrating a communication system in which a mobile terminal 100 according to the present disclosure is operable.

First, referring to FIG. 2A, the communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like.

Hereinafter, for the sake of convenience of explanation, the description disclosed herein will be limited to CDMA. However, it is apparent that the present invention may be also applicable to all communication systems including a CDMA wireless communication system.

As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.).

The intersection of a sector and frequency assignment may be referred to as a CDMA channel. The BSs 270 may also be referred to as Base Station Transceiver Subsystems (BTSs). In this case, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the terminals 100 being operated within the system. The broadcast receiving module 111 as illustrated in FIG. 1 may be provided in the mobile terminal 100 to receive broadcast signals transmitted by the BT 295.

In addition, FIG. 2A illustrates several global positioning system (GPS) satellites 300. Such satellites 300 facilitate locating at least one of a plurality of terminals 100. Though two satellites are illustrated in FIG. 2A, location information may be obtained with a greater or fewer number of satellites. The location information module 115 as illustrated in FIG. 1 may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various terminals 100. At this time, he terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including the systemization of soft handoffs between the base stations 270. Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the terminals 100.

Next, a method of acquiring the location information of a terminal using a WiFi (Wireless Fidelity) positioning system (WPS) will be described with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Figure 3A:
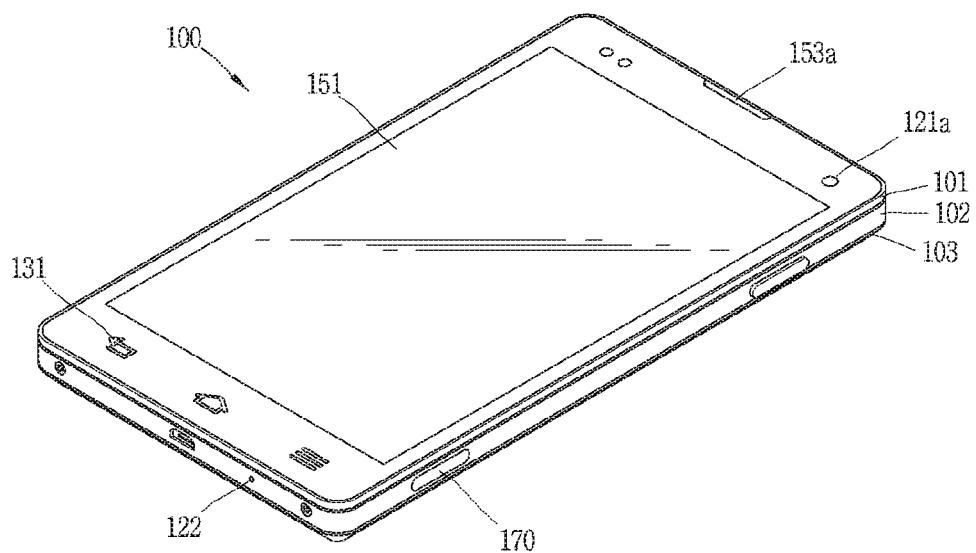
FIG. 3A is a front perspective view illustrating an example of a mobile terminal associated with the present disclosure.

FIG. 3A is a front perspective view illustrating an example of the mobile terminal 100 associated with the present disclosure.

The mobile terminal 100 disclosed herein is provided with a bar-type terminal body. However, the present invention may not be limited to this, but also may be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components is incorporated into a space formed between the front case 101 and the rear case 102. At least one middle case may be additionally disposed between the front case 101 and the rear case 102, and a battery cover 103 for covering the battery 191 may be detachably configured at the rear case 102.

The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. 3B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being output from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
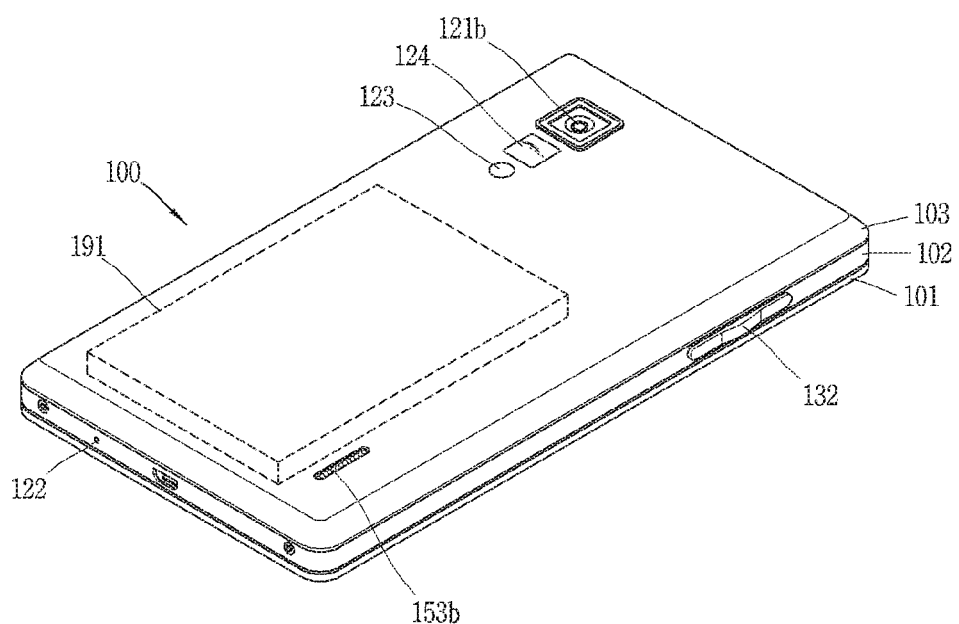
FIG. 3B is a rear perspective view illustrating a mobile terminal illustrated in FIG. 3A.

FIG. 3B is a rear perspective view illustrating mobile terminal 100 illustrated in FIG. 3A.

Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

Furthermore, the extracted location information of the mobile terminal 100 may be transmitted to the mobile terminal 100 through the WiFi location determination server 310, thereby allowing the mobile terminal 100 to acquire location information.

Figure 4:
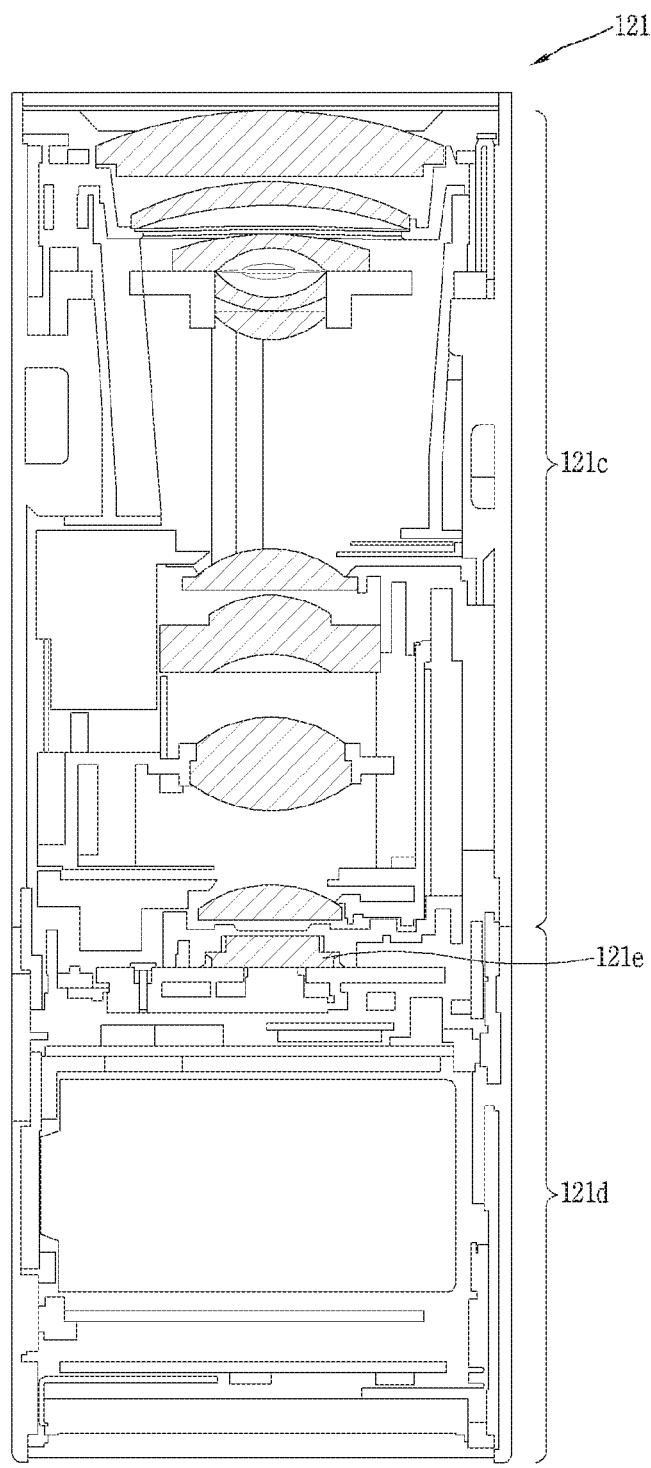
FIG. 4 is a cross-sectional view for explaining the internal configuration of a camera module constituting a camera according to an embodiment of the present disclosure.

FIG. 4 is a cross-sectional view for explaining the internal configuration of a camera module constituting a camera 121 according to an embodiment of the present disclosure. The camera module according to an embodiment may include a plurality of lenses 121c, a light field engine 121d and a light field sensor 121e.

The light field sensor 121e may be formed such that the sensor senses and record light moving in all directions over substantially entire regions (a space in which light is illuminated). The light field sensor 121e acquires images for which the focuses are formed on different ranges, namely, depths, according to the size of an iris contained in the camera terminal. A camera module according to the present embodiment is formed to collect image information at different angles, respectively, at a time to store them in the memory 160, instead of focusing on objects to be captured.

A camera module according to an embodiment records the direction information of light reflected from an object, whether it is reflected light from how far from the camera module or incident light in which direction. Though not shown in the drawing, the images may be converted and displayed into 2-dimensional or 3-dimensinal images. Accordingly, the focus can be changed from the acquired one image.

In other words, the display unit 151 of the mobile terminal according to the present disclosure displays an image acquired by the camera 121. The controller controls the display unit 151 to display a representative image among a plurality of different images stored in the memory. Furthermore, the controller controls the display unit 151 to convert the representative image to another image based on a touch input applied to the display unit 151.

According to an embodiment of the present disclosure, the controller controls the display unit 151 to display one representative image or display a plurality of representative images stored in the memory at once. When at least one representative image is displayed on the display unit 151, the controller controls the display unit 151 to display another image associated with the plurality of representative images, respectively, based on the user's touch input applied to the display unit 151.

Here, another image associated with the representative image, as an image acquired at a substantially same time as the representative image based on the user's capture control command, corresponds to an image for which the focus is formed on a different configuration (or different region) or image for which an object contained in the representative image is acquired at a different angle from the representative image.

Hereinafter, a control method of changing an image based on a touch input applied to the display unit 151 will be described.

Figure 5:
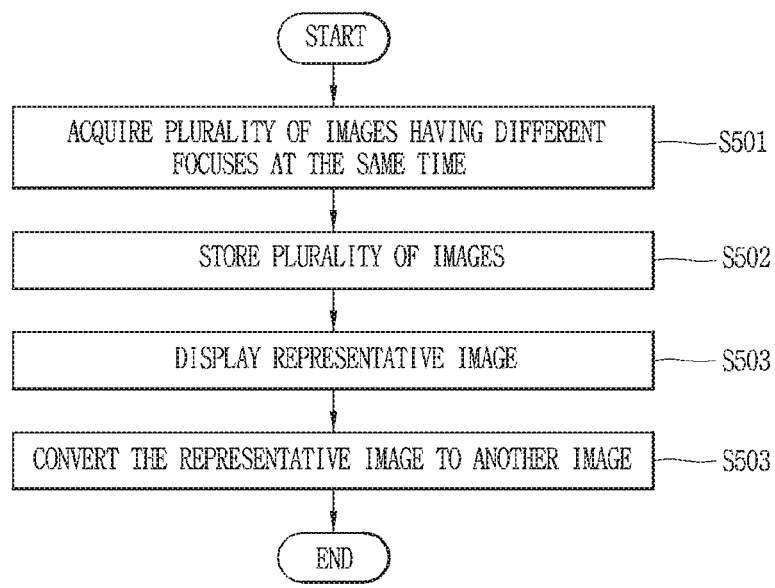
FIG. 5 is a flow chart for explaining a control method of a mobile terminal according to an embodiment of the present disclosure.
Figure 6A:
FIGS. 6A through 6C are conceptual views for explaining the control method of FIG. 5 according to each embodiment.

FIG. 5 is a flow chart for explaining a control method of a mobile terminal according to an embodiment of the present disclosure, and FIG. 6A is a conceptual view for explaining the control method of FIG. 5 according to each embodiment.

The camera 121 acquires a plurality of images having different focuses at a substantially same time based on the user's control command (S501). For example, when a camera application for acquiring an external environment as an image is activated to display a preview image of the external environment on the display unit 151, a plurality of images are acquired based on a capture icon displayed on the display unit 151 or a control command applied to the signal input unit formed on the body of the mobile terminal.

Referring to FIG. 6A, a plurality of images are acquired at different angles at a substantially same time, and the focuses thereof are formed at different locations. The plurality of images for which the focuses are formed at different locations are acquired based on the same control command applied by the user. For example, when the camera application and the camera are activated to acquire images, a plurality of images are acquired at a substantially same time based on one control command applied to the mobile terminal. The plurality of images are stored in the memory 160 (S502), and the controller 180 controls the display unit 151 to display one of the plurality of stored images as a representative image 510 (S503).

For example, 6A corresponds to an execution screen in which one image of the execution screen of a gallery application for displaying photos stored therein is selected and displayed. However, it may not be necessarily limited to this, and correspond to the execution screen of an application for editing photos, screen information in case of uploading photos online, or the like.

For the sake of convenience of explanation, a region in which the focus is clearly adjusted is illustrated as a bold line, a region in which the focus is not adjusted and shown in a blurred manner as a dotted line, and a region with an intermediate level of focus as a solid line. An object corresponding to the region displayed with a dotted line may be dimly seen in actuality and thus formed in such a manner that the shape is blurred or the edge of the object is not clear.

In other words, the controller 180 controls the camera to image the external environment such that the focus is formed on one region and the one region is clearly shown but the remaining region is shown in a relatively dim manner. The plurality of images are formed such that the focused and relatively clearly imaged regions compared to the other region are differently shown. Accordingly, the plurality of images may be formed such that their focuses are adjusted on substantially different objects and clearly shown objects are differently shown.

The controller 180 controls the display unit 151 to display an image selected in an arbitrary manner or preset criteria from the plurality of images as a representative image. Here, the preset criteria may be determined based on a preset angle or focal length based on the internal structure of a camera module, and the criteria may be applicable in various ways. Hereinafter, a control method of converting the representative image 510 to another associated image will be described.

Referring to FIG. 6A, the controller 180 controls the display unit 151 to display a representative image 510 among a plurality of images stored in the memory 160. The controller 180 displays an icon that receives a touch input to display another image associated with the representative image 510 for which the focus is formed on a different location (or object) based on a control command applied in a state that the representative image 510 is displayed.

The icon may include a list for deleting the representative image 510, moving it to another photo folder, or editing the representative image.

Referring to FIG. 6A, when a touch input is applied to an icon (focus change) to convert the representative image 510 to the another image, the controller 180 controls the display unit 151 to display a first control image 510 for selecting another image having the different focus.

The first control image 510 is formed with a continuous (vertical) scroll bar. A scroll box contained in the scroll bar corresponds to a plurality of focuses applied to the plurality of images. In other words, the controller 180 may control the display unit 151 to move the scroll box so as to display another image containing the different focus. In other words, the scroll bar extended in one direction is divided to correspond to the number of images, and when the scroll box is located at one region of each scroll bar by the user, the controller 180 controls the display unit 151 to display an image corresponding to the one region.

Furthermore, the controller 180 may control the display unit 151 to consecutively convert the plurality of different images based on a dragging type touch input for consecutively moving the scroll box of the first control image 610. Accordingly, it may be seen to the user such that only the focus of an image containing the same object is consecutively changed. In other words, it may be displayed in such a manner that a clearly expressed region on the substantially same image is varied.

For example, when three persons are included in an external environment, the controller 180 controls the memory 160 to acquire three images for which the focuses are formed on the three persons, respectively, at the same time by the camera, and store the three images. The scroll bar are divided into three regions, and when the scroll box is located in one of the three regions, the controller 180 controls the display unit 151 to display an image for which the focus is formed on a person corresponding to the one region.

Referring to FIG. 6A, the controller 180 controls the display unit 151 to display another image for which the focus is formed on a different region from that of which the focus is formed on the representative image 610 and acquired by a substantially same control command as that of the representative image 610 based on a touch input applied to the first input window 610. In other words, the representative image is converted to another image (S504).

The controller 180 can store another image 511 for which the focus has been changed based on a touch input applied to an icon for storing an image displayed on the display unit 151. The storage of the another image 511 denotes storing a representative image displayed on the display unit 151 as the another image 511. Accordingly, the user can control the display unit to display an image for which the focus is formed on his or her desired object or one region. For example, the controller 180 may control the display unit 151 to immediately display an image to which the changed focus is applied based on a control command for activating a gallery application that displays images acquired by the camera 121.

However, the present disclosure may not be necessarily limited to this, and the controller 180 may control the memory to store the another image 511 in addition to the representative image 510. Accordingly, the same object may be acquired at a substantially same time in the storage space of the gallery application, and the representative image 510 and the another image 511 for which the focuses are formed on different regions may be stored at once.

According to the present embodiment, the user may apply a touch input to the display unit 151 that displays the acquired photos to receive images for which the focus has been changed on the photo or store them in a separate manner. Furthermore, though not shown in the drawing, an additional function, such as sharing an image for which the focus has been changed using another application or the like, may be carried out based on a touch input applied to the display unit 151.

A control method of changing the focus of an image and editing one region of the image will be described with reference to FIG. 6B.

Figure 6B:
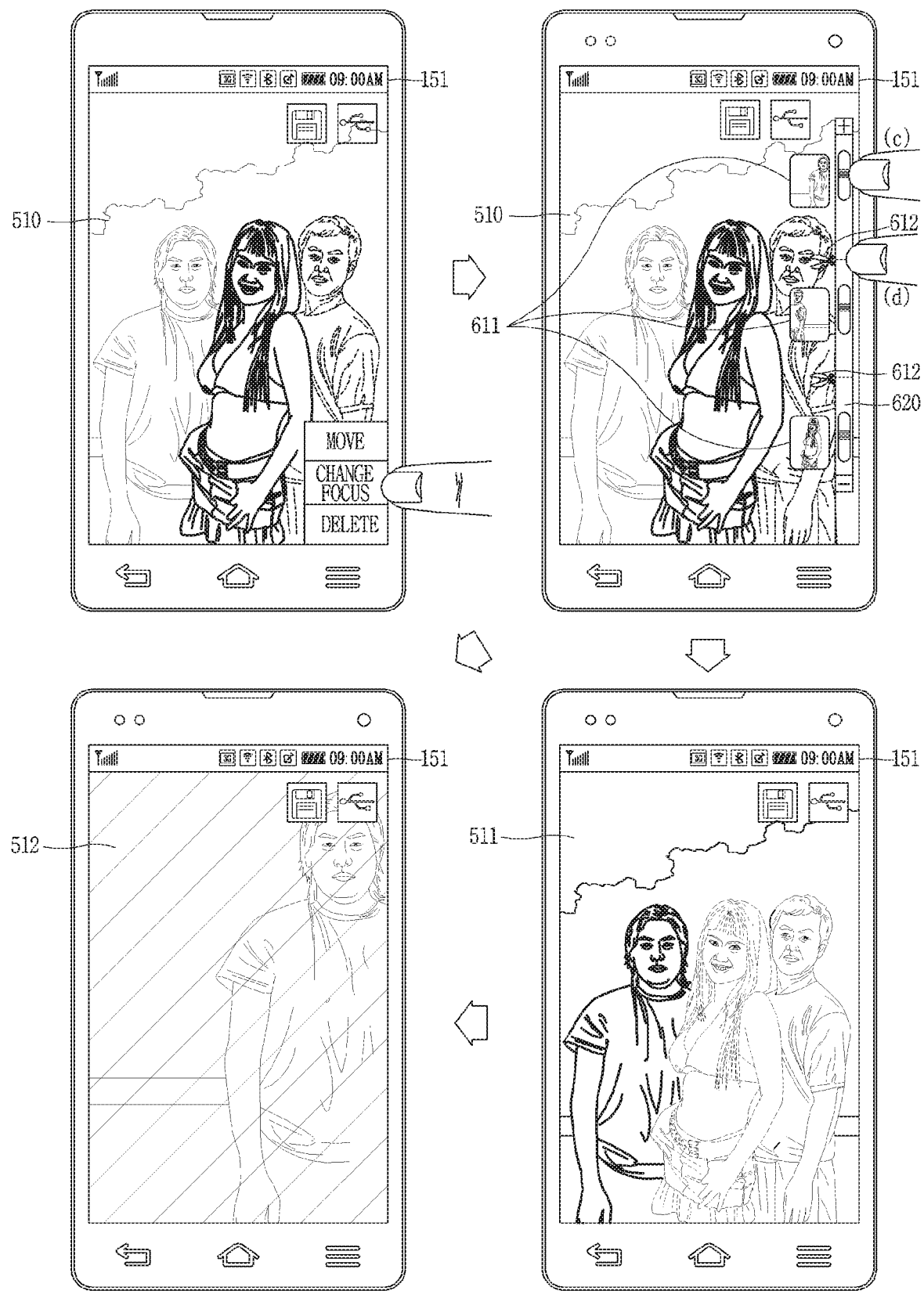

Referring to FIG. 6B, when the representative image 510 is displayed on the display unit 151, the controller 180 controls the display unit 151 to display a first control image 610 based on a touch input applied to the display unit 151.

The first control image 610 is formed with a scroll bar shape containing a scroll box. Furthermore, the first control image 610 may include a plurality of thumbnail views 611 and at least one first edit icon 612.

The plurality of thumbnail views 611 are formed to correspond to the number of a plurality of images acquired by the camera 121, and formed to display a region corresponding to the focus of each image. In other words, the thumbnail views 611 display different one region of the image.

The thumbnail views 611 are displayed adjacent to the scroll bar, and disposed to be separated from one another. However, it may be allowed to have irregular distances between each thumbnail view 611. For example, when a plurality of focal lengths applied to the camera 121 are not specified in a regular manner, a distance between thumbnail views 611 corresponding to each focus may be formed in an irregular manner.

The controller 180 may change the representative image 510 to another image 511 based on a touch input applied to the first control image 610 to move the scroll box to be adjacent to each thumbnail view 611. The controller 180 controls the display unit 151 to display another image 511 for which the focus is formed on an object shown on the thumbnail view 611 displayed in a region adjacent to the scroll box.

The another image 511 may be configured in such a manner that the focus formed on the representative image 511 is formed on a different region, and accordingly, a clearly displayed region on the representative image 511 may be different from that of the another image 511. In other words, the controller 180 may display another image 511 for which a region corresponding to the thumbnail view 611 is clearly shown.

The controller 180 controls the display unit 151 to cut only part of the another image 511 based on a touch input applied to the first edit icon 612. In other words, the controller 180 controls the display unit 151 to take and display only the selected one edit region 512 based on a touch input applied to the icon of the another image 511.

A first edit icon 612 may be formed between the each thumbnail view 611. For example, referring to FIG. 6B, the controller 180 controls the display unit 151 to display an edit region 512 contained in the thumbnail view 611 at the top based on a touch input applied to the first edit icon 612 formed between the two thumbnail views 611.

For example, when a touch input is applied to two first edit icons 612 in FIG. 6B, the controller 180 may control the display unit 151 to display an edit region displayed in the middle of the three thumbnail views 611.

A touch input for displaying the edit region 512 is unrelated to a touch input applied to the scroll box for adjusting the focus of the image. In other words, the edit image may be displayed in a blurred state for which the focus is not adjusted based on a touch input applied to the first edit icon 612.

Furthermore, the controller 180 may store the edit region 512 in a separate manner based on a touch input applied to the display unit 151 in a state that the edit region 512 is displayed.

Accordingly, the user can change a focused region as well as edit and display one separated region based on the focused region.

Figure 6C:
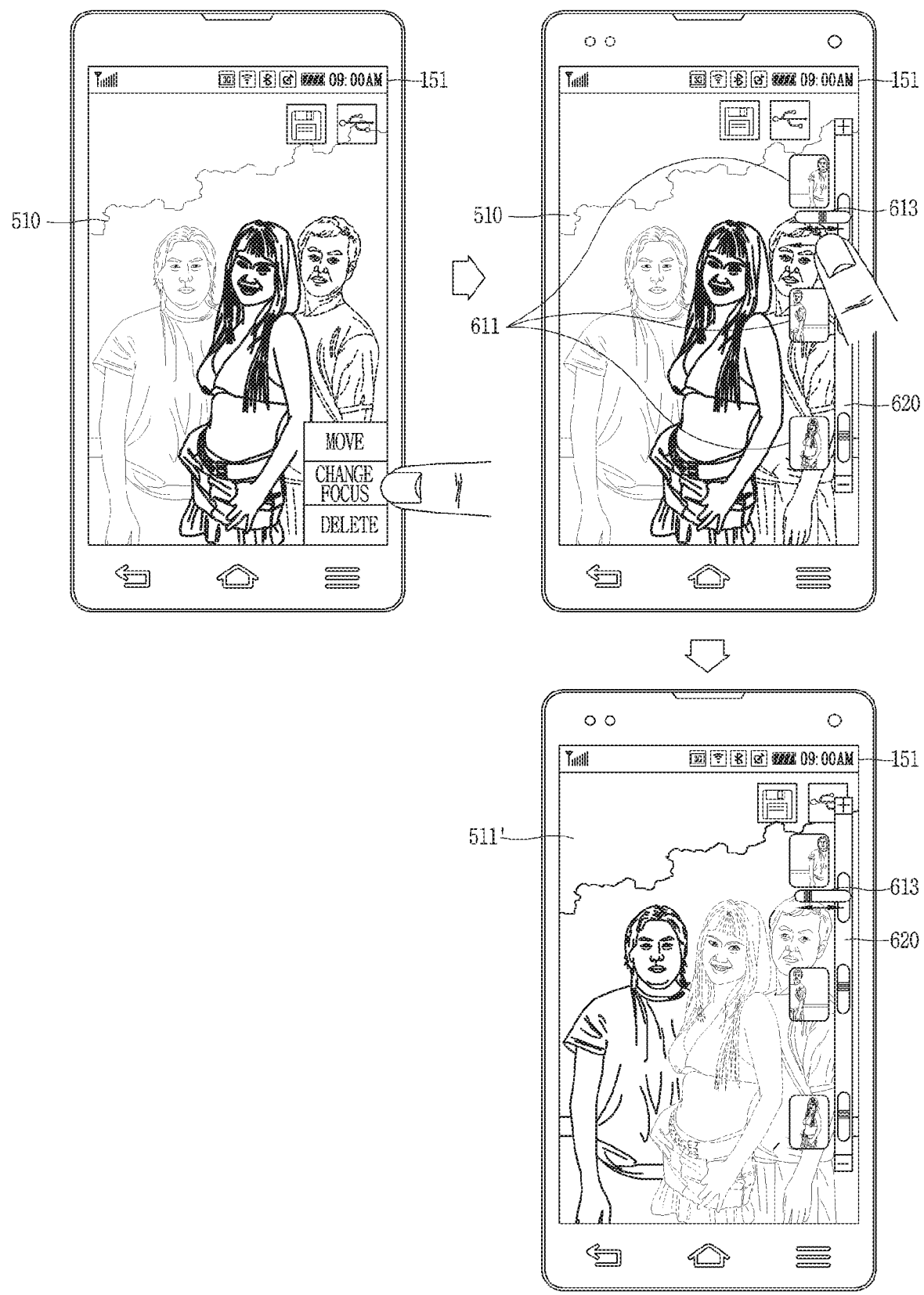

A control method of adjusting the definition of a focused region will be described with reference to FIG. 6C. Referring to FIG. 6C, the controller 180 controls the display unit 151 to display a second edit icon 613 on the second control image 620. The second edit icon 613 may be formed with a scroll bar shape extended in the horizontal direction, and a plurality of second edit icons 613 may be formed in a region adjacent to the thumbnail view 611.

The controller 180 may control the display unit 151 to adjust the definition of each region of the image displayed on the thumbnail view 611 based on a touch input applied to the second edit icon 613.

For the second control image 620, a touch input may be applied in the horizontal direction to increase or decrease the definition of a region corresponding to the thumbnail view 611. However, the definition of an unfocused region may be restricted not to be increased greater than that of a focused region. In other words, the controller 180 controls the display unit 151 to display another image 511' having an adjusted definition.

Accordingly, the user can adjust the definition of a divided region.

FIGS. 7A through 7D are conceptual views for explaining various control methods of tracking a figure when a plurality of figures are contained in an image.

Figure 7A:
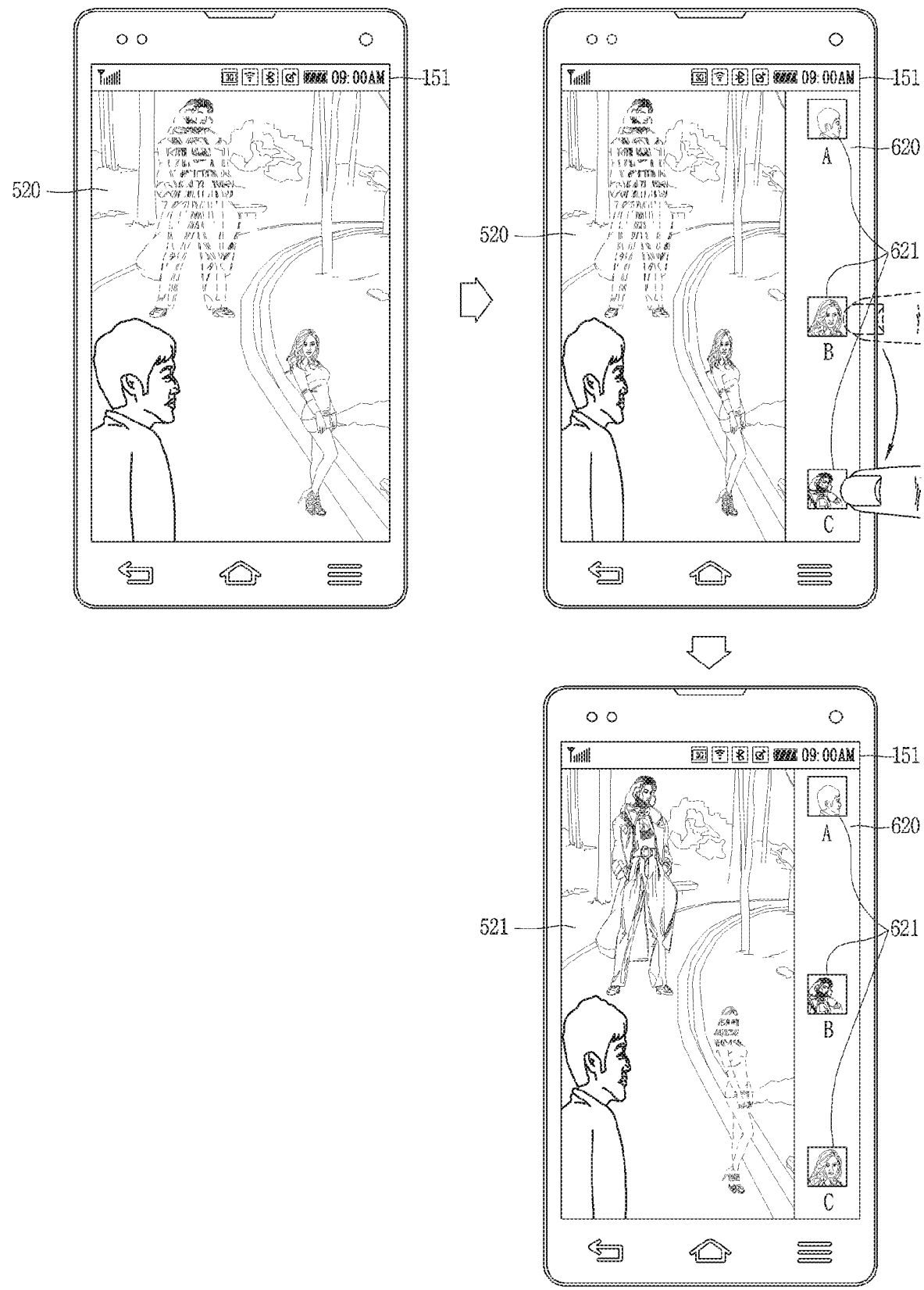
FIGS. 7A through 7E are conceptual views for explaining various control methods of tracking a figure when a plurality of figures are contained in an image.

A control method of forming a focus around a figure contained in the image will be described with reference to FIG. 7A. FIG. 7A is a view illustrating the display unit 151 on which a representative image 520 containing a plurality of figures is displayed. For example, it corresponds to an image in which three figures are located at different locations, and the focus is adjusted on one figure. A figure for which the focus is well adjusted is illustrated as a bold line, a figure for which the focus is not adjusted and shown in a blurred manner as a dotted line, and a figure for which an intermediate level of focus is adjusted as a solid line.

The controller 180 tracks a figure contained in the representative image 520 based on the touch input. Furthermore, the controller 180 controls the display unit 151 to display the second control image 620 based on the tracked figure.

The second control image 620 may be displayed at a lateral surface of the representative image 520 or at least part of that may be formed to be overlapped with the representative image 520. The second control image 620 may include a graphic image 621 containing an image of the tracked figure. Furthermore, the controller 180 controls the display unit 151 to display a representative name corresponding to the tracked figure along with the graphic image 621.

The controller 180 may analyze the tracked figure to perform a function of retrieving whether or not there is information matched to data stored in the memory 160 or retrieving whether or not there is information matched to an image of the figure on the web. When there is the matched information, the controller 180 controls the display unit 151 to apply the matched information to the graphic image and display it. However, when the matched information is not found, the controller 180 may not record a representative name and the like or control the display unit 151 to display notification information indicating that it has not been found.

An image contained in the graphic image 621 may correspond to a representative image (for example, an image stored in the address book) of the information of the tracked figure or correspond to a figure image of the representative image 520.

The representative images 520 are formed to receive a touch input, and displayed to be separated from one another on the second control image 620. Furthermore, the controller 180 controls the display unit 151 to arrange and display them in the definition order of graphic images 621 corresponding to the each figure.

For example, the controller 180 controls the display unit 151 to display such that a graphic image 621 corresponding to a figure for which the focus is most correctly adjusted on the figure's face is disposed at the top, and a graphic image 621 corresponding to a figure for which the focus is not correctly adjusted on the figure's face is disposed at the bottom.

Accordingly, the user can confirm whose figure is contained in the representative image and receive the information of a figure for which the focus is not adjusted and shown in a blurred manner. Furthermore, the user can receive information on the focus on the representative image 520.

Referring to FIG. 7A, the controller 180 may control the display unit 151 to change and display the location of graphic images 621 arranged so as to provide the focus information of a figure based on the user's touch input (for example, a dragging type touch input).

The controller 180 may move the location of the graphic image (B) to another region based on a consecutive touch input applied to the one graphic image (B). Accordingly, the sequence of the graphic images may be A-C-B.

The controller 180 controls the display unit 151 to change the focus of the representative image 520 based on the sequence of the graphic images 621. In other words, the controller 180 controls the display unit 151 to display another image 521 for which the focus is formed on a region different from that of the representative image 520 by a graphic image 621 contained in the second control image 620 in which the arrangement is changed. Accordingly, the user can recognize that the focus of an image is changed based on a touch input applied to the second control image 620.

The controller 180 may control the display unit 151 to change a focus adjusted on the figure by the graphic image 621 in which the arrangement is changed. In other words, the controller 180 controls the display unit 151 not to adjust the focus on a figure contained in the one graphic image (B) (namely, focus-out), and display another image 521 for which an intermediate level of focus is adjusted on a figure contained in one graphic image (C) moved to a relatively medium region.

In other words, the user may move the location of the graphic image 621 containing the information of a figure to check the figure on the image or receive an image in which the selected figure is clearly shown.

Figure 7B:
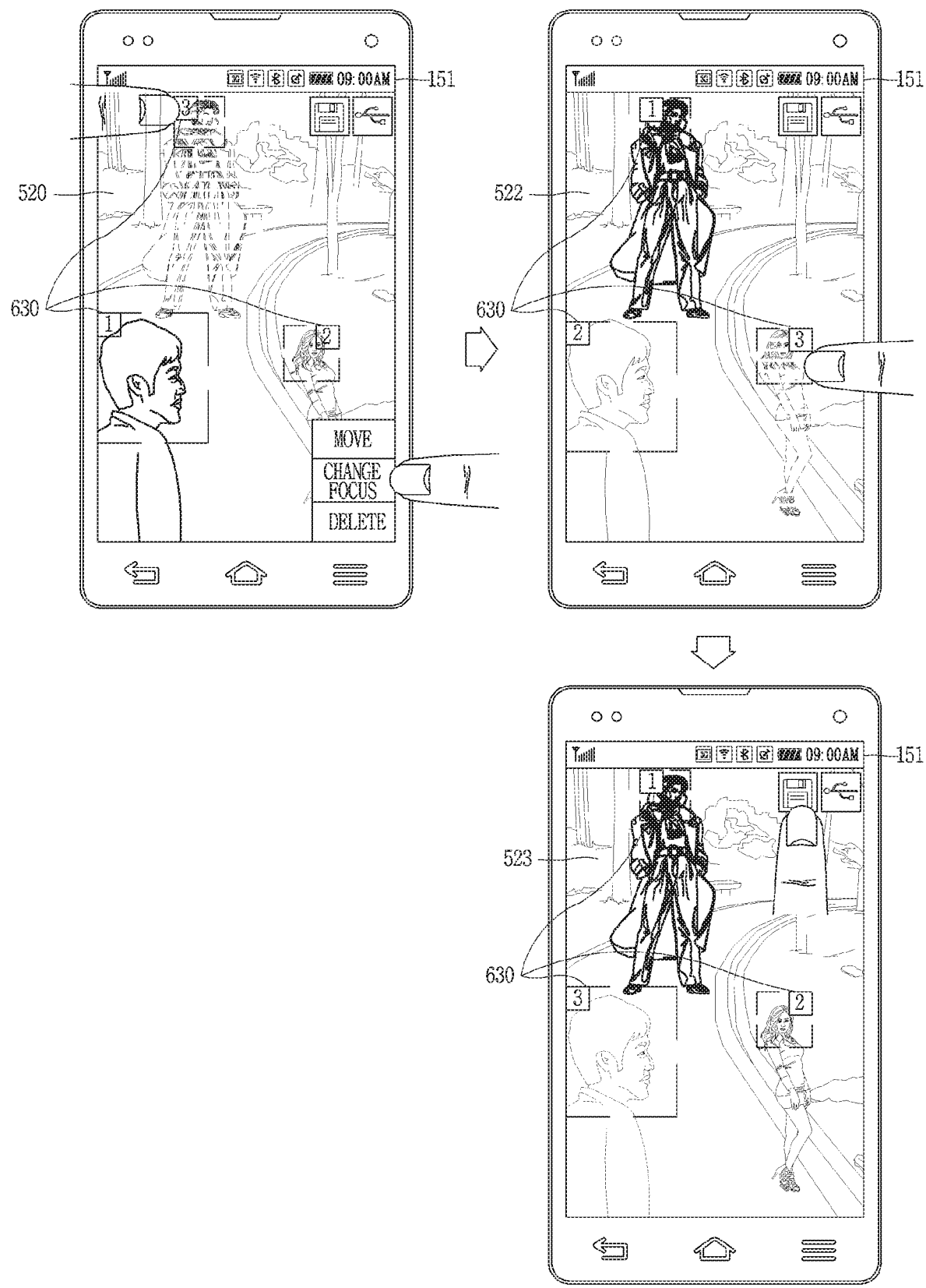

A control method of applying a touch input to an image to change a figure on the image for which the focus is adjusted will be described with reference to FIG. 7B. Referring to FIG. 7B, the controller 180 controls the display unit 151 to display an icon that receives a control command for changing a focus based on a touch input applied to the display unit 151.

The controller 180 controls the display unit 151 to display a third control image 630 displayed on the representative image 520 based on a touch input applied to the icon. The third control image 630 is formed with a plurality of graphic images displayed for figures, respectively, contained in the representative image 520.

Furthermore, the third control image 630 may include a numeral corresponding to the order for which each focus is adjusted and clearly shown.

First, the controller 180 tracks a figure contained in the representative image 520 based on a touch input applied to the icon. The controller 180 display a graphic image to allow the user to recognize a region of the tracked figure. For example, the controller 180 controls the display unit 151 to display the graphic image with an indicator surrounding the face of the tracked figure.

The third control image 630 configured with the plurality of graphic images is formed to receive a touch input. Referring to FIG. 7B, the controller 180 controls the display unit 151 such that the focus is formed on a figure corresponding to the graphic image to which a touch input is applied based on the touch input applied to one graphic image of the third control image 630. In other words, the controller 180 controls the display unit 151 to convert the representative image 520 to another image 522 for which the focus is formed on the corresponding figure.

Referring to FIG. 7B, the controller 180 may control the display unit 151 to change the focus of the relevant figure based on a touch input applied to the another graphic image. In other words, the controller 180 may change the focus of a figure corresponding to another graphic image based on a touch input applied to the another graphic image. However, the controller 180 may form in such a manner that the focus is more blurred than that of the figure of a graphic image to which a touch input is first applied.

In other words, the controller 180 controls the display unit 151 to adjust the focus on a figure to which a first touch input is applied, and display a changed image 623 for which the focus is less clearly adjusted than that of a figure to which a second touch input applied.

However, a control method of changing the image or changing a focus region may not be necessarily limited to this. For example, when two figures are displayed on the image, the controller 180 may control the display unit 151 such that the focus is formed on the figure of a graphic image to which the touch input is applied, and the focus is not formed (focus-out) on another figure.

Furthermore, the controller 180 may control the display unit 151 to sequentially change images for which the focus is formed on the figure to images for which the focus is not formed (focus-out) based on a touch input repetitively applied to the graphic image.

Accordingly, the user can receive a figure contained in a graphic image and selectively form a focus on the figure.

Figure 7C:
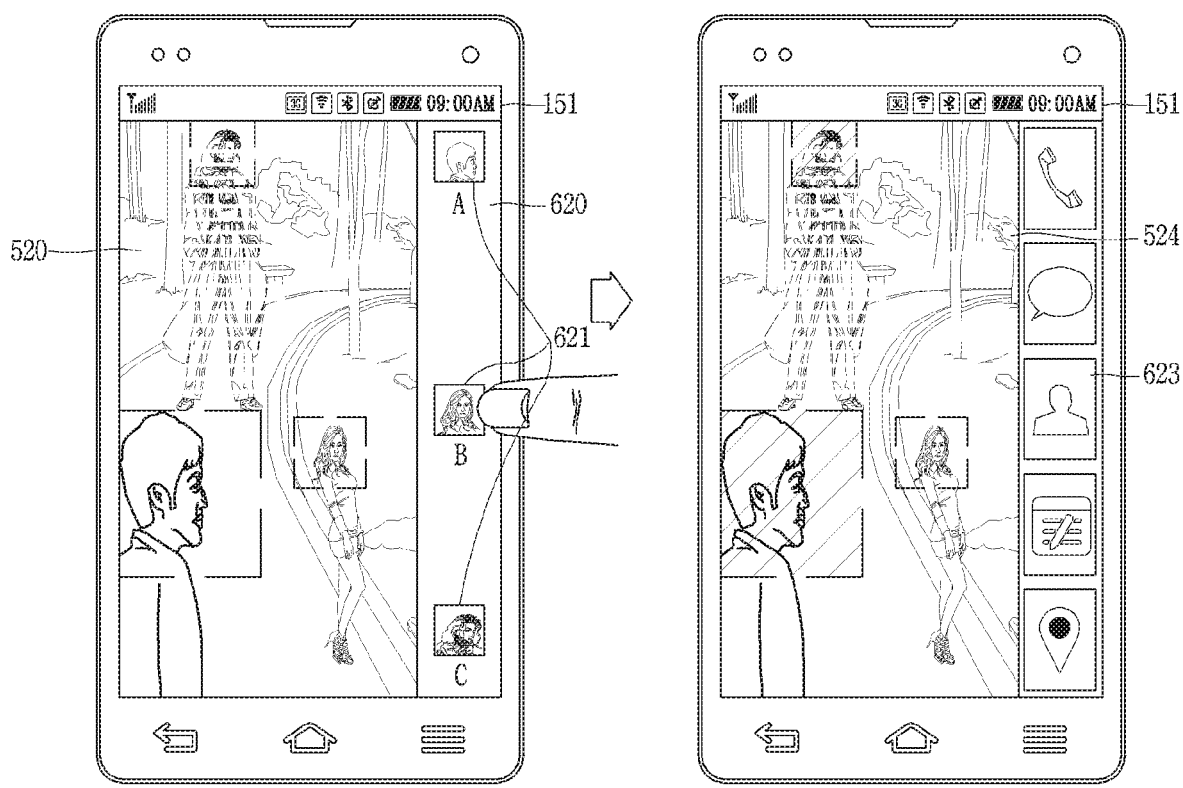

A control method of performing an additional function using the tracked figure will be described with reference to FIG. 7C.

The controller 180 controls the display unit 151 to track a figure contained in the representative image 520 based on a touch input applied to the display unit 151, and display a second control image 620. However, as illustrated in the drawing, the controller 180 may control the display unit 151 to display an indicator (a graphic image of the third control image 630, refer to FIG. 7B) in one region of the figure to display the location of the figure contained in the representative image 520.

The controller 180 controls the display unit 151 to display a plurality of icons 623 for executing a function for a figure corresponding to the touched graphic image 621 based on a touch input applied to the graphic image 621 of the second control image 620.

For example, the icon 623 may include an execution icon of a phone application for sending a call to an external terminal matched to the figure, an execution icon of a message application for sending a text message to the external terminal, an execution icon of an address book application for outputting information on the figure, and the like.

However, it may not be necessarily limited to this, and the icon 623 may include an execution icon of an application that is unrelated to the selected figure. For example, the icon 623 may include a memo application, a GPS execution icon for recognizing a current location, and the like. The controller 180 may execute a function for tagging information to the selected figure by the execution of the memo application.

Furthermore, the controller 180 may control the display unit 151 to adjust the brightness of one region of the each figure based on a touch input applied to the graphic image 621. For example, the controller 180 may control the display unit 151 to display a figure selected by the graphic image 621 in a bright manner, and the rest figures in a dim manner.

According to the present embodiment, the user can more easily execute another application program (or another function) associated with the tracked figure on a representative image.

Figure 7D:
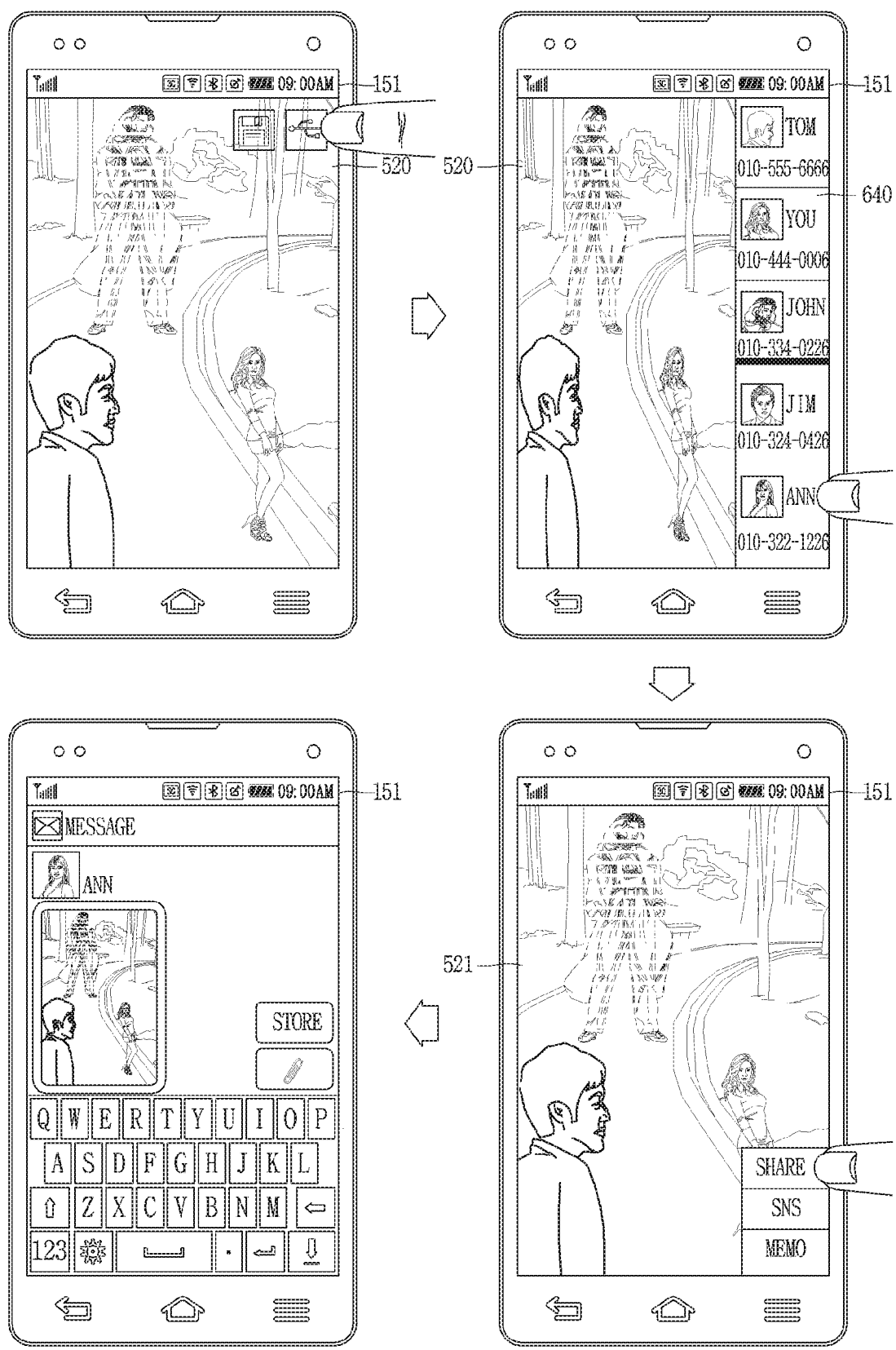

A control method of receiving additional information associated with the tracked figure and the figures will be described with reference to FIG. 7D. Referring to FIG. 7D, the controller 180 tracks a figure contained in the representative image 520. The controller 180 may control the display unit 151 to display information matched to the tracked figure.

For example, the controller 180 may control the display unit 151 to display the information (for example, information stored in the storage space of an address book application) of an external terminal matched to the figure. Furthermore, the controller 180 may control the display unit 151 to display the other information of a substantially same category other than information matched to the figure. In other words, the controller 180 may control the display unit 151 to display the other information of the external terminal stored in the storage space of the address book application at the same time.

However, the present disclosure may not be necessarily limited to this, and the controller 180 may control the display unit 151 to display information on various figures associated with the tracked information. Here, the figure associated with the information may correspond to a figure (for example, a figure contained in or associated with the friendship or the same group) associated through a social network.

Accordingly, the user can more easily receive information regarding a figure contained in the representative image or information associated with the figure.

Furthermore, information regarding the tracked figure is formed with a fourth control image 640 for receiving a touch input. The controller 180 may control the display unit 151 to convert the representative image 520 to another image 521 for which the focus is changed based on a touch input applied to the fourth control image 640.

Referring to FIG. 7D, the controller 180 may share an image based on a touch input applied to the fourth control image 640. For example, the controller 180 may control the image to be transmitted to the external terminal of the selected figure.

For example, when a figure selected by the touch input is not contained in the representative image 520, the controller may transmit the representative image 520 to the external terminal of the figure.

Hereinafter, when a figure selected by the user is contained in the representative image, a control method of sharing it will be described with reference to 7E.

Figure 7E:
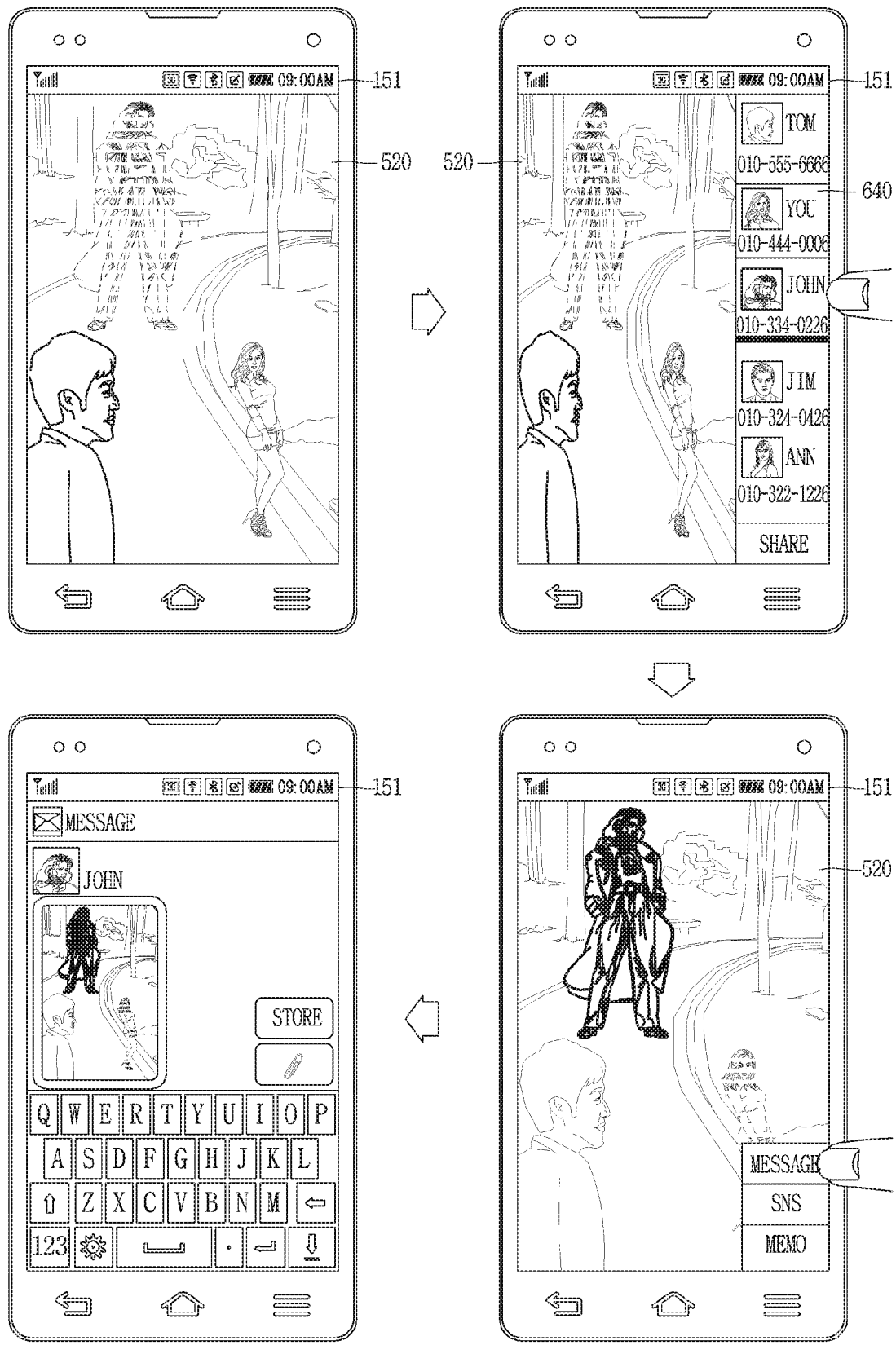

Referring to FIG. 7E, when a figure contained in the representative image 520 is selected by the user's touch, the organic electroluminescent device 10 controls the display unit to display another image 521 for which the focus is adjusted on the figure to clearly exhibit the figure.

When a share method is selected by the user's touch input, the controller 180 controls the another image 521 to be shared for the selected figure. On the other hand, when a figure contained in the representative image 520 is selected for a share object without the process of selecting the share method, the controller may control the another image 521 to be shared.

For example, when a figure (JOHN) contained in the representative image 520 is selected for an object to be shared, the controller activates a message application to form the send number as the phone number of the figure (JOHN). Furthermore, the controller 180 controls the display unit 151 to display an execution screen of the application in a state that another image for which the focus is formed on the figure (JOHN) and clearly shown is automatically appended.

Accordingly, the user can selectively share an image for which a figure for sharing the image is clearly shown without an additional control command for adjusting the definition.

However, the present disclosure may not be necessarily limited to this, and when uploading an image such as SNS, in case where a figure contained in the representative image is tagged while the user uploads the representative image, the controller may control another image for which the tagged figure is clearly shown to be uploaded. In other words, when the representative image 520 is used as information corresponding to a figure contained in the representative image 520, the controller may control such that it is converted to another image for which the focus is clearly formed on the figure to perform a function.

Figure 8A:
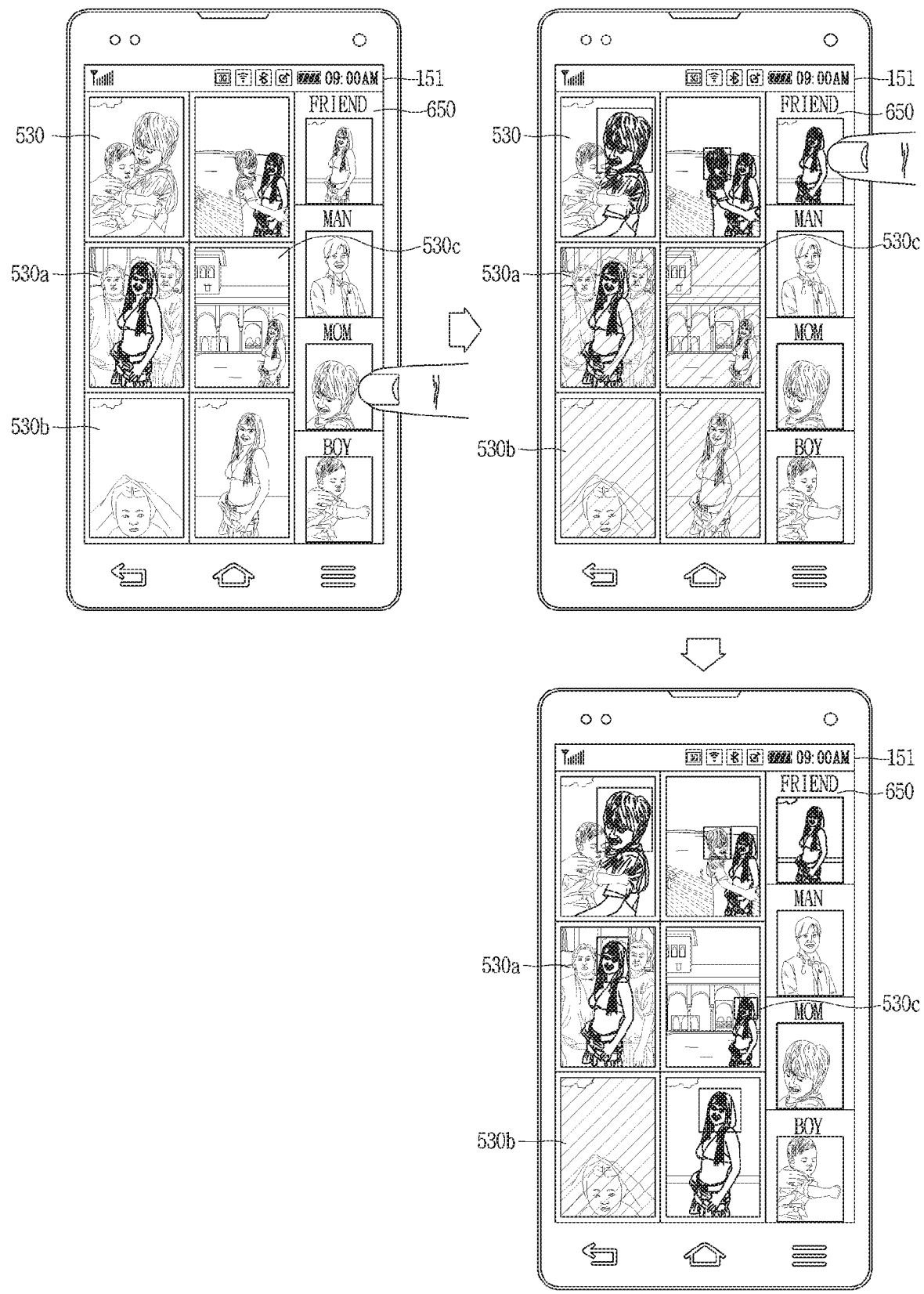
FIGS. 8A through 8C are conceptual views for explaining a control method of changing focuses when a plurality of representative images are displayed at once.
Figure 8B:
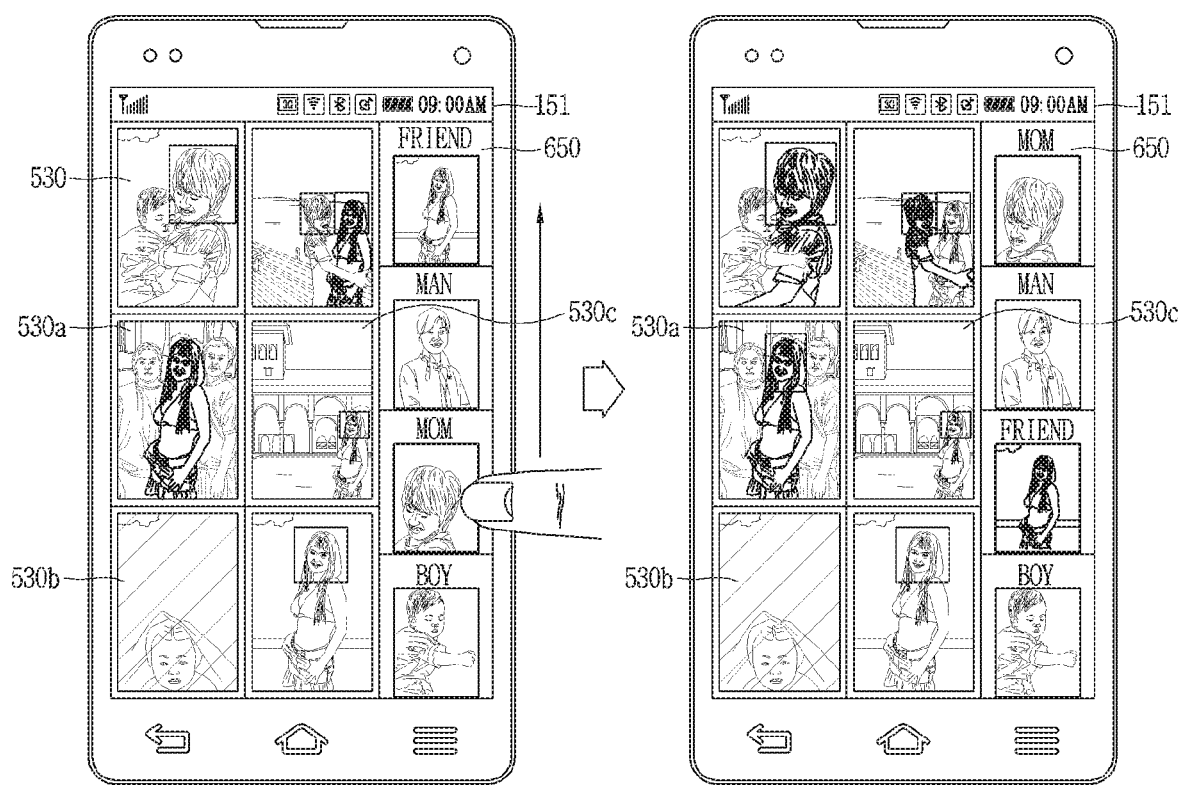
Figure 8C:
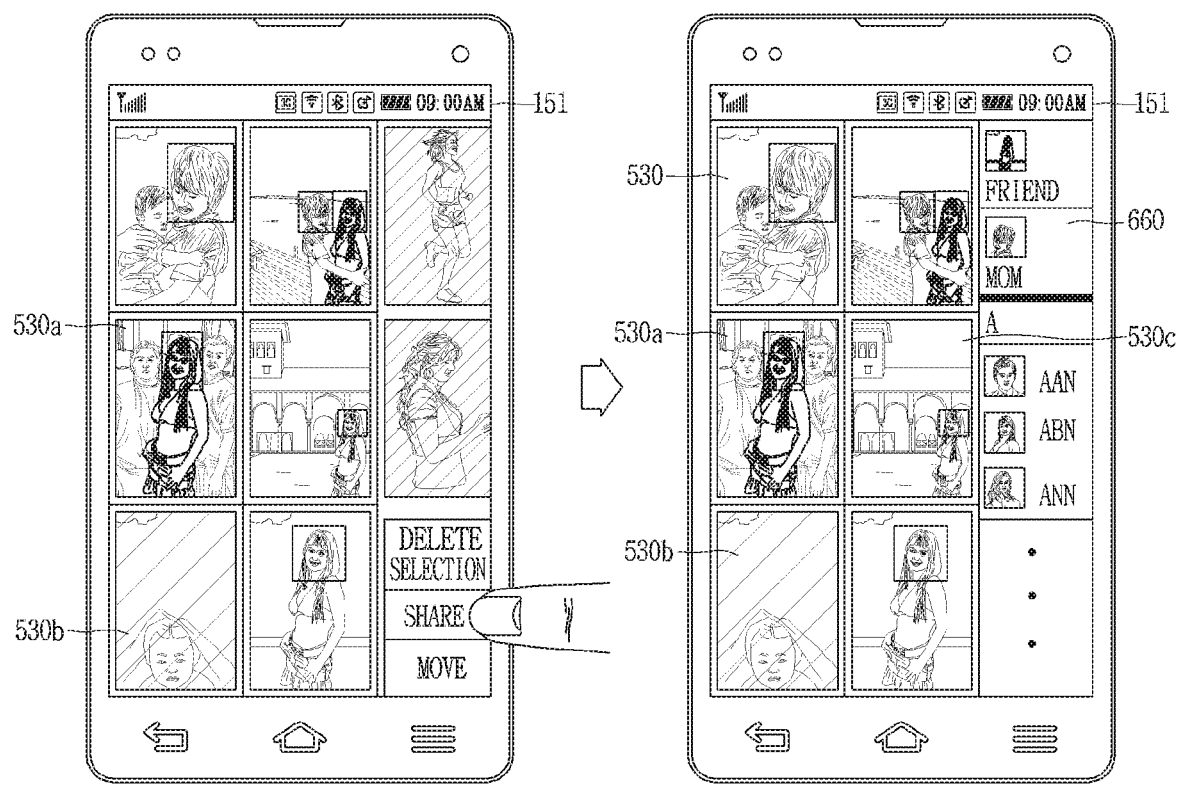

FIGS. 8A through 8C are conceptual views for explaining a control method of changing focuses when a plurality of representative images are displayed at once.

A control method of selecting the tracked figure to change the focus will be described with reference to FIG. 8A. FIG. 8A illustrates screen information 530 in which a plurality of representative images are displayed at once. For example, the screen information 530 is one of the execution screens of a gallery application for displaying the acquired photos. In other words, it corresponds to screen information in which a plurality of photos stored in the storage space of the gallery application are displayed at a time, and the user can apply a touch input to one of the photos to display a photo in an enlarged manner.

Representative images contained in the screen information 530 are photos acquired by the camera 121, and the memory 160 stores the representative images and their associated images captured at a plurality of focuses and angles. However, the present disclosure may not be necessarily limited to this, and if it is a representative image containing associated images acquired at a substantially same time and acquired at various angles with various focuses, then it may be also allowed when downloaded or separately stored.

The controller 180 tracks a figure contained in the plurality of representative images based on a preset control command applied while displaying the screen information 530. The controller 180 controls the display unit 151 to display a fifth control image 650 containing the tracked figure and information (for example, the representative name of the figure stored in the memory 160) corresponding to the figure. The fifth control image 650 may include a plurality of graphic images containing the information of the each figure.

For example, the controller 180 may include a first representative image 530a containing a first and a second figure, a second representative image 530b containing a third figure, and a third representative image 530c containing a second figure.

The controller 180 controls the display unit 151 to form an indicator on the first figure in the each representative image based on a touch input applied to a graphic image corresponding to the first figure (MOM) contained in the fifth control image 650.

Furthermore, the controller 180 controls the display unit 151 to change the focus of at least one representative image containing the first figure. For example, the controller controls the display unit 151 to change it to another image 530a' for which the focus is formed on the first figure among associated images acquired at a substantially same time along with the first representative image 530'.

Furthermore, the controller 180 controls the display unit 151 to display a representative image that does not contain the first figure (MOM) in a dark manner. For example, the controller 180 controls the display unit 151 to display the second and the third representative image 530b, 530c in a dark manner based on a touch input applied to a graphic image corresponding to the first figure (MOM).

Referring to FIG. 8A, the controller 180 controls the display unit 151 to form a focus to the second figure on a graphic image containing the second figure based on a touch input applied to a graphic image corresponding to the second figure (FRIEND).

For example, the controller 180 controls the display unit 151 to display a representative image (for example, the third representative image) containing the second figure in a bright manner.

Referring to a third representative image 530c containing only the second figure, the controller 180 controls the display unit 151 to display another image 530c' associated with the third representative image 530 for which the focus is formed on the second figure.

Referring to a second representative image 530b containing the first and the second figure, the controller 180 controls the display unit 151 to display another image 530b' associated with the second representative image 530b for which the focus is formed on the first and the second figure. The another image 530b' may correspond to an image for which the focus is more accurately formed on either one of the first and the second figure.

For example, the controller 180 may determine a level at which the focus is adjusted according to the sequence of touch inputs applied to the fifth control image 650.

According to the present embodiment, when a plurality of representative images are displayed at once on the display unit 151, the user can control such that representative images containing the figure are automatically selected to adjust a focus on the figure at the same time based on one touch input for selecting the figure.

Though not specifically shown in the drawing, the user can concurrently store images formed at the same time by the fifth control image 650.

A control method of changing the focus level of a plurality of figures selected from the fifth control image will be described with reference to FIG. 8B. FIG. 8B illustrates the display unit 151 on which a plurality of images for which the focus is formed on the first and the second figure are displayed based on a touch input applied to the graphic images of the first and the second figure contained in the fifth control image 650.

The controller 180 may display the graphic image with a different shape to indicate that the graphic image has been selected based on a touch input applied to the graphic images of the each figure. For example, the display unit 151 may modify and display the brightness and color of the graphic image or process and display the graphic image in a highlighted manner. Accordingly, the user can recognize the selected figure.

The controller 180 may control the display unit 151 to change the location of a graphic image corresponding to each figure on the fifth control image 650 by a touch input (for example, a consecutive input, a dragging type touch input, etc.) applied to the graphic image in a state that the focus is formed on the plurality of figures.

For example, the controller 180 may control the display unit 151 to substitute the location of the graphic image of the second figure with the location of the graphic image of the first figure based on a consecutive touch input applied to the graphic image corresponding to the second figure.

However, the present disclosure may not be necessarily limited to the illustration of FIG. 8B, and the controller 180 may control the display unit 151 to display the graphic image of the first and the second figure rather than a graphic image (MAN) corresponding to the non-selected figure thereon.

When the location of the graphic image of the first and the second figure is changed based on the touch input, the controller 180 controls the display unit 151 to more accurately adjust the focus of the second figure than that of the second figure.

For example, referring to a first representative image 530a, the controller 180 controls the display unit 151 to convert the first representative image 530a to another image 530a' associated with the first representative image 530a for which the focus is formed on the second figure.

Accordingly, the user can convert a plurality of representative images to different images with a changed focus using a graphic image contained in the fifth control image 650, and easily perform a focus change on a plurality of figures.

A control method of sharing the plurality of representative images will be described with reference to FIG. 8C. FIG. 8C illustrates the display unit 151 on which a plurality of representative images including an image for which the focus is adjusted on the first and the second figure are displayed at once.

The controller 180 controls the display unit 151 to track a figure contained in the plurality of images based on a touch input applied to an icon for sharing the plurality of images, and display a sixth control image 660 containing the information of the tracked figure.

The sixth control image 660 may include a graphic image corresponding to each figure, and the graphic image of the selected figure may be displayed at an upper portion of the sixth control image 660. Furthermore, the sixth control image 660 may include a figure contained in the representative images and a graphic image of the associated figure.

The controller 180 may share at least one of the plurality of representative images for a figure due to the control command based on a control command applied to the graphic image.

Figure 9A:
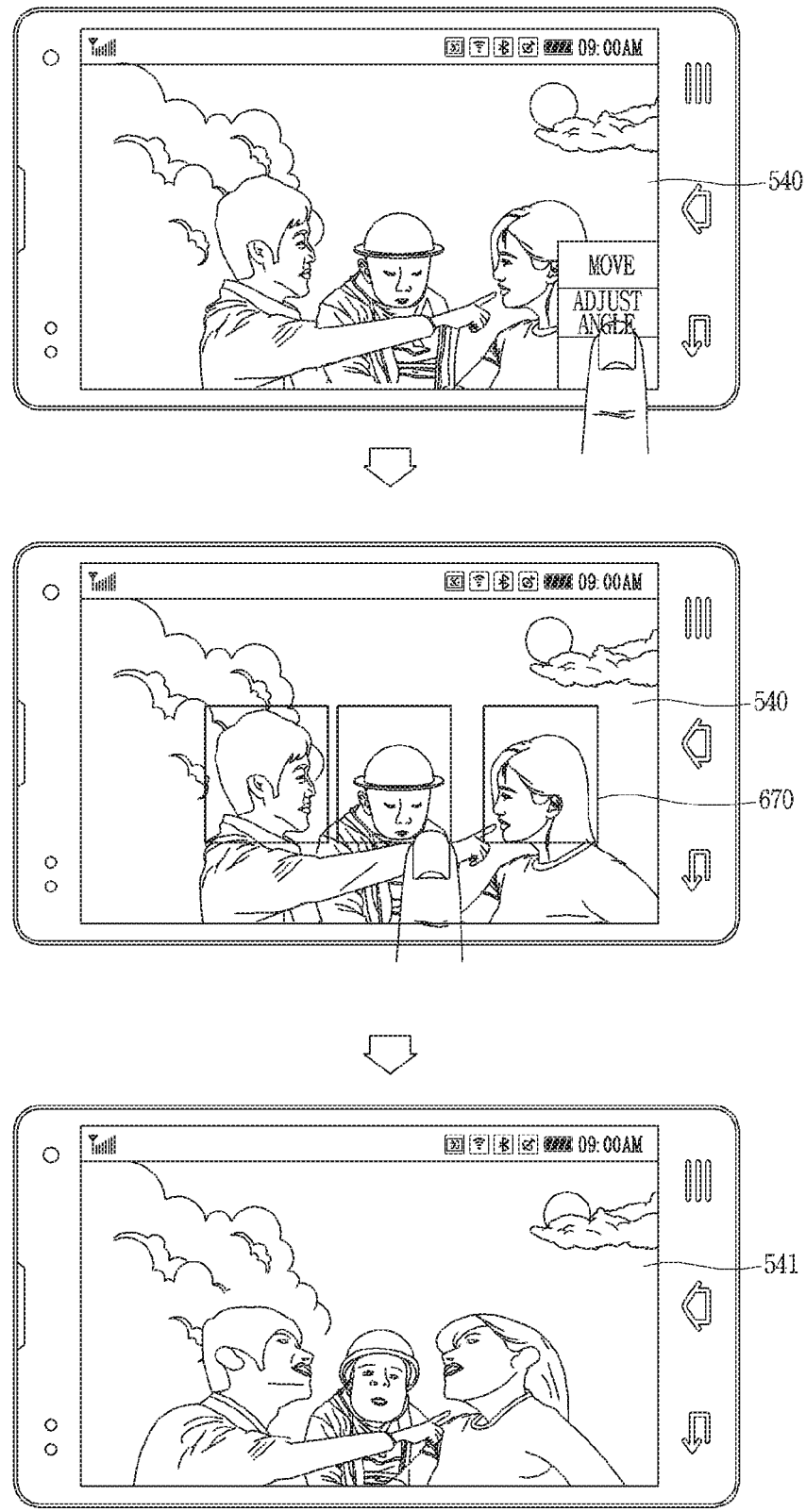
FIGS. 9A and 9B are conceptual views for explaining a control method of displaying images at different angles for which the objects are acquired.
Figure 9B:
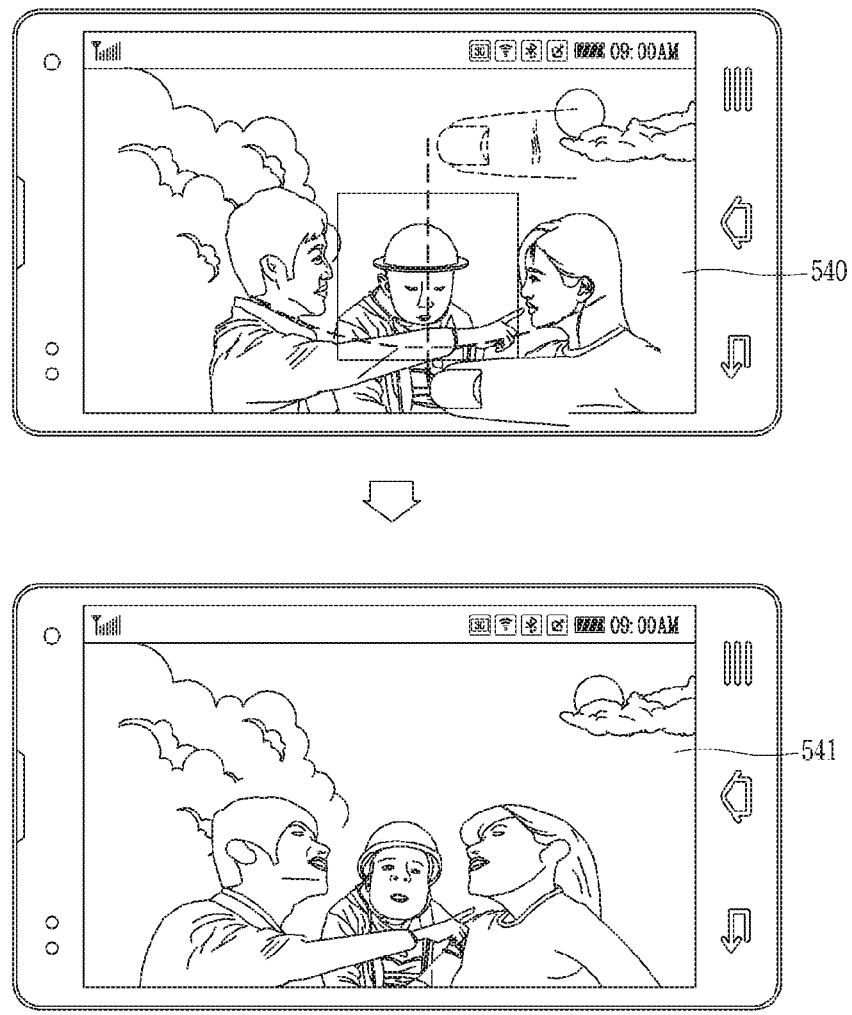

FIGS. 9A and 9B are conceptual views for explaining a control method of displaying images at different angles for which the objects are acquired.

Referring to FIG. 9A, the camera may include a plurality of images acquired at different angles at a substantially same time. Furthermore, the controller 180 controls the display unit 151 to display an image acquired at a preset angle among the plurality of images as a representative image.

According to the present embodiment, the controller 180 controls the display unit 151 to display another image 541 acquired at a different angle at a substantially same time based on a touch input applied to the display unit 151 that displays a representative image 541.

When a control command for adjusting an angle at which the object is acquired is applied, the controller 180 may track a figure contained in the representative image 540, and track the gaze of the tracked figure's eye. The controller 180 displays a seventh control image 670 to be overlapped with a figure contained in the representative image 540 to indicate the tracked figure. For example, the seventh control image 670 may be formed with a symbol displayed on each figure's face.

The controller 180 controls the display unit 151 to change the fourth control image 640 to another image 641 so as to correspond to the figure's gaze based on a touch input applied to the seventh control image 670 indicating the one figure. In other words, the another image 641 corresponds to an image captured in the direction of facing the selected figure.

When the selected figure looks down in the fourth control image 640 as illustrated in FIG. 9A, the another image 641 corresponds to an image acquired in the downward direction.

However, when there is no images acquired in the direction of facing the selected figure's gaze (for example, a camera according to the present disclosure captures an object within a preset angle range, and thus a capture image at an angle other than the preset range may not be formed), the controller may control the display unit 151 to display an image captured in the direction closest to the facing direction. Furthermore, in case of the foregoing, the controller 180 may control the display unit 151 to display information in which there is no images (corresponding to the selected figure's gaze) acquired from the facing direction. Furthermore, the controller 180 may control the display unit 151 to display the representative image 540 in a bounce effect for displaying in such a manner that an image captured in the closest direction is returned again to the representative image 540.

According to still another embodiment, when the gazes of a plurality of figures are converged to one figure (or another object), a figure at a location where their gazes are converged may be defined as the selected figure. In other words, when two figures look at one person as illustrated in FIG. 9A, the controller 180 controls the display unit 151 to display an image according to the figure's gaze.

Though not shown in the drawing, the controller 180 may control the display unit 151 to convert a region containing the selected figure to part of another image acquired at a different angle.

For example, when a distinguished touch input (for example, a long touch input) is applied to the seventh control image 670 displayed on the selected figure as illustrated in FIG. 8A, the controller 180 controls the display unit 151 to display part of an image acquired in the direction of facing the selected figure's gaze instead of a region containing the selected figure.

However, the controller 180 may control the display unit 151 to display a graphic image containing the information of the tracked figure (refer to FIG. 7A), and control the display unit 151 to display another image based on the selected figure's gaze based on a touch input applied to the graphic image.

In other words, there is no limit in a control method for selecting at least one of the tracked figures contained in a representative image.

In other words, the controller 180 may control the display unit 151 to combine and display the representative image with part of another image associated with the representative image.

Accordingly, the user may convert and display a plurality of images captured at different angles at the same time to images captured at his or her desired angle or partially combine and display them.

On the other hand, though not shown in the drawing, when a control command for sharing the selected figure and the representative image 540 is applied and the selected figure is contained in the representative image 540, the controller 180 may control the display unit to share the another image 541.

In other words, when performing a function associated with a figure contained in the representative image 540, the controller 180 may control the mobile terminal to use the another image 541 acquired at an angle corresponding to the figure's gaze.

FIG. 9B illustrates a control method of displaying an image acquired at a different angle according to another embodiment.

Referring to FIG. 9B, the display unit 151 displays an eighth control image 680 to be overlapped with the representative image 540. The eighth control image 680 indicates an angle at which the camera has acquired an object. The eighth control image 680 may be formed with two line segments crossed with each other. Accordingly, the user can recognize a limited range of angles at which associated images are acquired.

Referring to FIG. 9B, the controller 180 controls the display unit 151 to display another image 541 displayed at a different angle based on a touch input applied along the eighth control image 680. For example, the controller 180 may control the display unit 151 to display another image corresponding to a time point at which a touch input consecutively entered to the eighth control image 680 is released.

Furthermore, the controller 180 may control the display unit 151 to consecutively convert and display a plurality of images acquired by the consecutive angle based on a touch input consecutively applied to the eighth control image 680.

Though not shown in the drawing, the controller 180 may control the memory 160 to store the another image 541 in a separate manner, or store the another image 541 as a representative image of the associated images.

According to the present embodiment, the user can receive a plurality of images captured at different angles for the same object, and more easily receive an image captured at his or her desired angle by a touch input applied to the display unit 151.

Figure 10A:
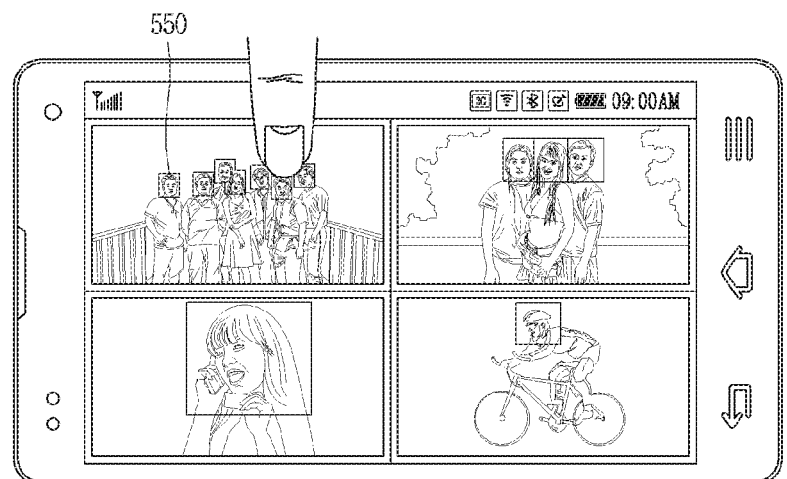
FIGS. 10A and 10B are conceptual views for explaining a control method of changing a capture angle for which a plurality of representative images are acquired when the plurality of representative images are displayed at once on the display unit.
Figure 10A:
Figure 10A:
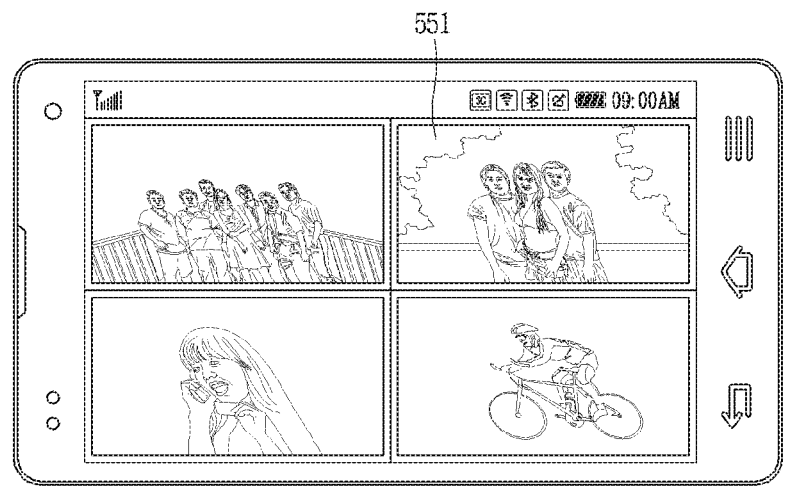
Figure 10B:
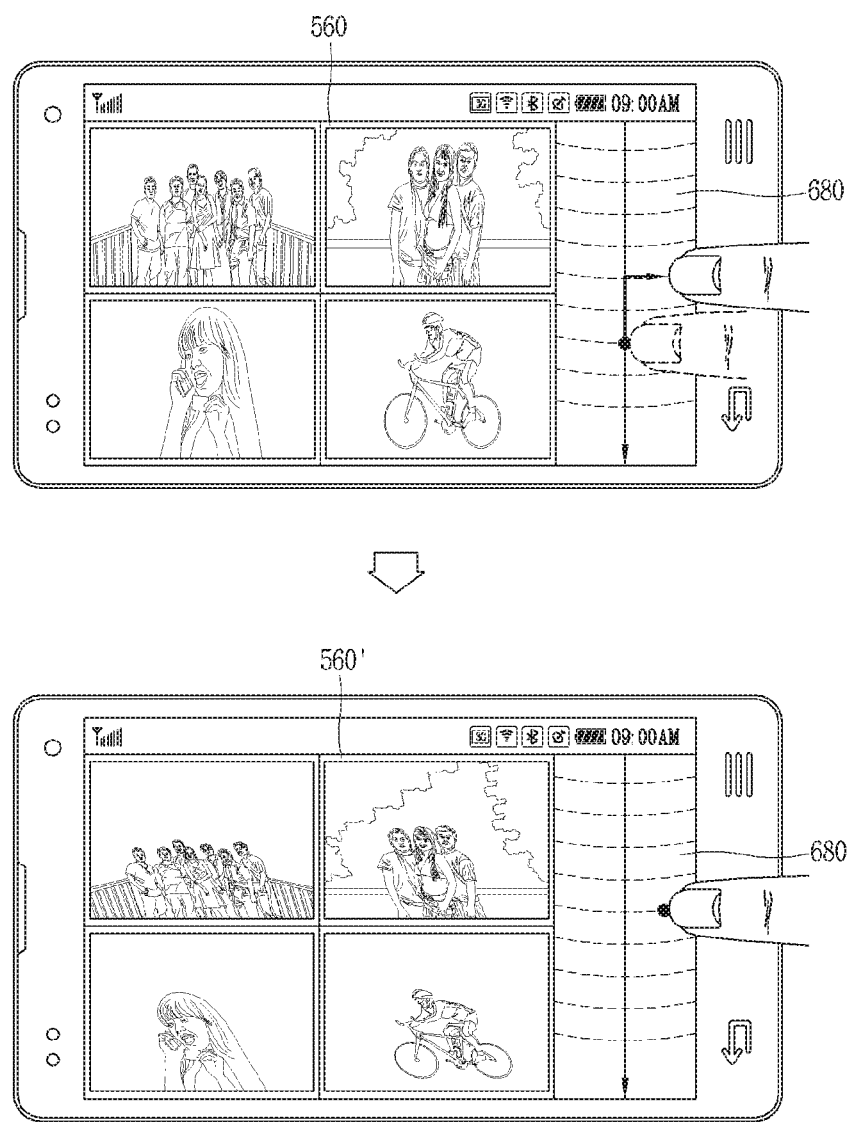

FIGS. 10A and 10B are conceptual views for explaining a control method of changing a capture angle for which a plurality of representative images are acquired when the plurality of representative images are displayed at once on the display unit 151.

A control method of displaying an image based on the selected figure's gaze by the selection of the tracked figure will be described with respect to FIG. 10A. Referring to FIG. 10A, the controller 180 controls the display unit 151 to track a figure contained in the plurality of representative images and display an indicator on the figure.

When a touch input is applied to one region of the display unit 151 that displays the figure, the controller 180 selects the figure to track the figure's gaze. The controller 180 controls the display unit 151 to display another image acquired in the direction of facing the selected figure's gaze, and associated with the representative images, respectively.

For example, the selected representative image 550 containing the selected figure is converted to another image 551 for which the same object is captured at a different angle at a substantially same time as the selected representative image. Furthermore, the rest representative images excluding the selected representative image 550 among the plurality of representative images are also converted to different images captured in the direction of facing the selected figure's gaze and associated with the representative image.

In other words, the user can select a plurality of figures contained in a plurality of representative images to convert a plurality of images displayed on the display unit 151 at the same time according to the figure's gaze.

Accordingly, the user can more easily receive images for which different objects are captured at different time points at one angle.

A control method of converting a plurality of images according to another embodiment will be described with reference to FIG. 10B. Referring to FIG. 10B, the controller 180 controls the display unit 151 to display a ninth control image 690 for converting a plurality of representative images for which different objects are captured at different time points to other images associated with each representative image and captured at different angles.

The ninth control image is formed with a plurality of line segments. The line segment indicates an angle at which an object can be captured by the camera 121, and an indicator point indicating an angle at which a representative image currently displayed on the display unit 151 is captured may be contained in the line segment.

For example, the indicator point may indicate an angle at which the selected representative image 550 selected by the user's touch input from a plurality of images displayed on the display unit 151. The indicator point is displayed on a line segment of the ninth control image 690. In other words, the plurality of representative images may correspond to images captured at different directions.

The controller may control the display unit 151 to move the indicator point to another location on the line segment based on the user's touch input applied to the display unit 151.

The controller 180 controls the display unit 151 to display another image associated with a plurality of representative images, respectively, captured at an angle corresponding to the moved indicator point.

Furthermore, though not shown in the drawing, the controller 180 may control the display unit 151 to consecutively convert a plurality of different images based on the user's touch input consecutively applied to the ninth control image.

Accordingly, the user can receive a plurality of images displayed on the display unit 151 at the same time as images acquired at the same angle based on the camera 121.

Though not shown in the drawing, the controller 180 may control the memory 160 to store the plurality of concurrently converted images at once based on the user's additional control command.

The configurations and methods according to the above-described embodiments will not be applicable in a limited way to the foregoing terminal and a terminal mounted with a cover, and all or part of each embodiment may be selectively combined and configured to make various modifications thereto.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a touch screen;
a plurality of camera lenses; and
a controller configured to:
capture, via the plurality of camera lenses, a plurality of images in response to a single capture command;

cause the touch screen to display an image among the plurality of images and a scroll bar for controlling a depth of field of the image;

change the depth of field of the image using at least one of the plurality of images in response to a touch input applied to the scroll bar;

cause the touch screen to display another image with the changed depth of field based on the touch input; and cause the touch screen to display a plurality of thumbnail images adjacent to a plurality of regions comprising the scroll bar, wherein each of the plurality of thumbnail images is associated with a respective one of the plurality of regions and one of the plurality of thumbnail images is configured to have a different depth of field relative to another one of the plurality of thumbnail images.

2. The mobile terminal of claim 1, wherein the controller is further configured to control the touch screen to display an icon for displaying the scroll bar, and display the scroll bar in response to a touch input applied to the icon.

3. The mobile terminal of claim 1, wherein the plurality of regions are respectively associated with a different depth of field, and the controller is further configured to move a scroll box contained in the scroll bar based on the touch input, and change the depth of field of the image further based on a location of the moved scroll box.

4. The mobile terminal of claim 1, wherein the controller is further configured to display a plurality of edit icons adjacent to the plurality of thumbnail images, wherein each of the plurality of edit icons is configured to adjust a definition of each of the plurality of regions.

5. The mobile terminal of claim 1, wherein the controller is further configured to store the plurality of images in a memory.

6. The mobile terminal of claim 1, wherein the controller is further configured to store the another image with the changed depth of field, in response to a store command, in a memory.

7. The mobile terminal of claim 1, wherein the controller is further configured to terminate the displaying of the image when the another image with the changed depth of filed is displayed on the touch screen.

8. A method of a mobile terminal, the method comprising:
capturing, via a plurality of camera lenses, a plurality of images in response to one capture command;

displaying, on a touch screen, an image among the plurality of images and a scroll bar for controlling a depth of field of the image;

change the depth of field of the image using at least one of the plurality of images in response to a touch input applied to the scroll bar;

displaying, on the touch screen, another image with the changed depth of field based on the touch input; and displaying, on the touch screen, a plurality of thumbnail images adjacent to a plurality of regions comprising the scroll bar, wherein each of the plurality of thumbnail images is associated with a respective one of the plurality of regions and one of the plurality of thumbnail images is configured to have a different depth of field relative to another one of the plurality of thumbnail images.

9. The method of claim 8, further comprising:
displaying, on the touch screen, an icon for displaying the scroll bar, and when a touch input is applied to the icon, displaying the scroll bar.

10. The method of claim 8, wherein the plurality of regions are respectively associated with a different depth of field, and wherein the method further comprises:
moving a scroll box contained in the scroll bar based on the touch input, and changing the depth of field of the image further based on a location of the moved scroll box.

11. The method of claim 8, further comprising:
displaying, on the touch screen, a plurality of edit icons adjacent to the plurality of thumbnail images, wherein each of the plurality of edit icons is configured to adjust a definition of each of the plurality of regions.

12. The method of claim 8, further comprising:
storing the plurality of images in a memory.

13. The method of claim 8, further comprising:
storing the another image with the changed depth of field, in response to a store command, in a memory.

14. The method of claim 8, further comprising:
terminating the displaying of the image when the another image with the changed depth of filed is displayed.

* * * * *